(12) United States Patent
Gottfried et al.

(10) Patent No.: US 6,483,644 B1
(45) Date of Patent: Nov. 19, 2002

(54) INTEGRAL IMAGE, METHOD AND DEVICE

(76) Inventors: Phil Gottfried, 1207 Oakwood Trail, Southlake, TX (US) 76092; Scott Brosh, 6500 Impala Dr., Arlington, TX (US) 76017

( * ) Notice: Subject to any disclaimer, the term of this patent is extended or adjusted under 35 U.S.C. 154(b) by 0 days.

(21) Appl. No.: 09/368,604

(22) Filed: Aug. 5, 1999

Related U.S. Application Data

(60) Provisional application No. 60/095,785, filed on Aug. 7, 1998, now abandoned.

(51) Int. Cl.$^7$ .............................................. G02B 27/22
(52) U.S. Cl. ....................... 359/463; 345/419; 348/59; 352/48; 382/285
(58) Field of Search ................................ 359/458, 462, 359/463; 345/419; 355/22; 348/59, 54, 51; 352/57, 58; 382/285

(56) References Cited

U.S. PATENT DOCUMENTS

| | | | |
|---|---|---|---|
| 4,128,324 A | | 12/1978 | Seeger |
| 4,732,453 A | | 3/1988 | Montebello et al. |
| 4,772,094 A | * | 9/1988 | Sheiman ..................... 359/466 |
| 4,878,735 A | | 11/1989 | Vilums |
| RE35,029 E | * | 8/1995 | Sandor et al. ................. 355/22 |
| 5,581,402 A | * | 12/1996 | Taylor .......................... 355/22 |
| 5,675,377 A | | 10/1997 | Gibas |
| 5,678,095 A | | 10/1997 | Takezaki |
| 5,680,171 A | * | 10/1997 | Lo et al. ........................ 355/22 |
| 6,046,848 A | * | 4/2000 | Gulick .......................... 355/22 |
| 6,055,013 A | * | 4/2000 | Woodgate et al. ............ 348/59 |
| 6,091,482 A | * | 7/2000 | Carter et al. .................. 355/79 |
| 6,229,562 B1 | * | 5/2001 | Kremen ........................ 348/51 |

* cited by examiner

*Primary Examiner*—Cassandra Spyrou
*Assistant Examiner*—Lee A. Fineman
(74) *Attorney, Agent, or Firm*—George R. Schultz

(57) ABSTRACT

A method according to preparing an integral image from an interwoven image is provided. The interwoven image is prepared by interweaving at least two source images which have been divided into cells which themselves have been divided into image elements. By interweaving the image elements within each cell and forming an array of cells, an integral image is formed when the array of cells is viewed through a viewing screen. 3-dimensional, moving or motion, and images which are combinations thereof are formed with the present device. The method can be used in electronic display devices as well as on non-electronic services to form integral images. A 3-dimensional image formed by the present device will generally have a portion which appears to project above the surface of an overlaying viewing screen. A quality control method for the manufacture of three-dimensional integral image devices and for the selection of viewing screens is also provided herein. The quality of the integral image as well as the ease of manufacture and the versatility of integral image control are superior above other known methods for preparing integral image devices.

50 Claims, 33 Drawing Sheets

| 1 | 2 | 3 | 1 | 2 | 3 |
|---|---|---|---|---|---|
| 4 | 5 | 6 | 4 | 5 | 6 |
| 7 | 8 | 9 | 7 | 8 | 9 |
| 1 | 2 | 3 | 1 | 2 | 3 |
| 4 | 5 | 6 | 4 | 5 | 6 |
| 7 | 8 | 9 | 7 | 8 | 9 |

Pivotal Perspective Sequence-Side View

Pivotal Perspective Sequence- Top View

Linear Perspective Sequence -Side View

Linear Perspective Sequence - Top View

9

8

7

6

5

4

3

2

1

9

8

7

6

5

4

3

2

1

9  8  7

6  5  4

3  2  1

Top View

Side View

Top View

Side View

Compound Lens

Top View

Side View

Perspective View

INTEGRAL IMAGE, METHOD AND DEVICE

CROSS REFERENCE TO RELATED APPLICATIONS

This application depends from and claims priority to United States Provisional Application Ser. No. 60/095,785 filed Aug. 7, 1998, now abandoned.

TECHNICAL FIELD OF THE INVENTION

The present invention relates to methods and an apparatus for producing integral images. An integral image having a multiple axis, or viewing angle, three-dimensional image of a scene with forward and backward depth is prepared by interweaving a plurality of views of a scene in a specific pattern which is viewed through a screen.

BACKGROUND OF THE INVENTION

Various methods have been proposed for the formation of integral images. Traditionally the integral image has been formed using photographic techniques and a fly's-eye lens. A fly's-eye lens is a sheet of optically clear substrate with an array of semi-spherical lenses on one or both sides of the sheet that uses refraction to focus light. A photographic material is placed behind the fly's-eye lens and exposed. When the film is developed an array of images is formed corresponding to the fly's-eye lenslets. Each element of the image array represents a portion of the photographed scene from each lenslet's perspective.

Viewing the image array through the fly's-eye lens presents the observer with an integrated image of the scene wherein each lenslet provides image detail from differing perspectives as the observer's viewing angle changes. The eyes are separated by the interocular distance giving a slightly different angle of view to each eye for a stereoscopic effect.

A proposed method by Rodger de Montebello (U.S. Pat. No. 4,732,453) uses elaborate procedures to form the fly's-eye lens materials for an integral imaging camera and reproducing orthoscopic integral images as described. The primary difficulty being the dimensional precision required to manufacture the various components used to form and view the image.

An alternate method of integral photography proposed by Vilums (U.S. Pat. No. 4,878,735) uses an array of Fresnel zone plates. A Fresnel zone plate is "a flat bull's-eye image made of concentric, alternating clear and opaque rings" that diffracts light to a focus. The array of Fresnel zone plates is substituted for the fly's-eye lens. This method is particularly suited for imaging with non-visible light, such as X-rays.

Symmetrically distributed apertures on a plane has also been proposed as a substitute for the fly's eye and Fresnel zone plate screening methods. Seegar (U.S. Pat. No. 4,128,324) describes utilizing an "aperture-raster plate" to both generate and view the resultant three-dimensional image. Similarly, Takezaki U.S. Pat. No. 5,678,095 discloses a "non-transmittable or opaque surface having a plurality of transmission points "referred to as" incident ports" used in the generation and viewing of the three-dimensional image.

Additional reference is made to Gibas (U.S. Pat. No. 5,675,377) describes a three-dimensional imaging and display system. Using an acquisition device, image and distance information is captured from a plurality of points of view and output as a non-standard image consisting of image and distance data for each pixel captured from the points of view. The display device processes the non-standard image into a plurality of display images with a display panel having a fly's eye lens to produce a three dimensional image. Gibas's method requires a special image capture device to obtain the image and distance data used to construct the non-standard image as well as a special device to display the non-standard image as a three-dimensional image. The method is calculatively intensive requiring special image processing hardware to capture and display the three-dimensional image. As in the other prior art references the perceived depth does not project in front of the display. The output is limited to a dedicated display device thereby inhibiting its acceptance in the market place.

Most of the prior art above creates or generates the original three-dimensional image as a single exposure through a refractive or defractive screening means upon a light recording medium. This original "master" image is a result of incident light reflected from an object or scene through said screening means onto the recording medium. Unfortunately, several technical problems are presented to those who create integral images by these methods. All of these techniques result in an original integral image that is pseudoscopic i.e. the depth information is inverted from that of the original object or scene. A secondary procedure is required to create a true working stereoscopic image. This usually involves exposing through the original integral image, in precise alignment with a screening means, onto a second light recording medium. The photographic duplication process adds costs and reduces quality. Elaborate steps are also taken to minimize interstitial falloff or overlap of exposure. Additionally, all objects created in this manner will appear to recede into or be behind the surface of the screen i.e. no objects will appear to "float" in front of the screen. Fresnel zone plates and fly's eye lens materials are not readily available and the difficulty and cost of manufacturing of these materials make these techniques impractical for mass production.

A method according to integral imaging is needed that provides for the printing, projecting, displaying and broadcasting of integral images using existing digital imaging equipment and screening materials, wherein at least a portion of the image projects above the surface of an associated lens.

SUMMARY OF THE INVENTION

The present invention is directed toward methods and an apparatus for producing integral images hereafter known as Tru3™ images. In one embodiment of the invention, the method involves the use of multiple views captured from predetermined vantage points along a Cartesian coordinate grid. Elements from each perspective view are manipulated and incorporated into a single interwoven image according to a specified pattern. A viewing screen is placed in alignment between the observer and the interwoven image creating a Tru3D™ image. The combined unit of image and screen can then be illuminated from behind. The viewing screen then presents a discreet perspective view that corresponds to the observer's angle of view. As the viewer has two eyes separated by an interocular distance the illusion of three dimensions is perceived. The interwoven images could also involve an object in motion, in which case an animated three dimensional effect is observable by changing the viewing angle.

The number of views interwoven and the resolution of the Tru3D™ image is affected by the geometry of the viewing screen used as well as the space between the screen and image. Viewing screens consist of evenly spaced dots, as in an half-tone screen. In one embodiment, the viewing screen is a fly's-eye lens, zone plate array or a compound lenticular lens. A novel method of aligning the image and screen is described. Methods for producing static and dynamic Tru3D™ images are disclosed.

BRIEF DESCRIPTION OF THE DRAWINGS

For a more complete understanding of the present invention, and for further et ails and advantages thereof, reference is now made to the following Detailed Description taken in conjunction with the accompanying drawings, in which:

FIG. 3 is an illustration of an interwoven image of four square cells made from nine source images and arranged as a set of three by three element cells.

FIG. 4a is an illustration of an interwoven image of four rectangular cells made from eighteen source images and arranged as a set of six by three element cells.

FIG. 4b illustrates a portion of an interwoven image of three by three element cells arranged in an alternate configuration.

DETAILED DESCRIPTION OF DRAWINGS

Figure 1:
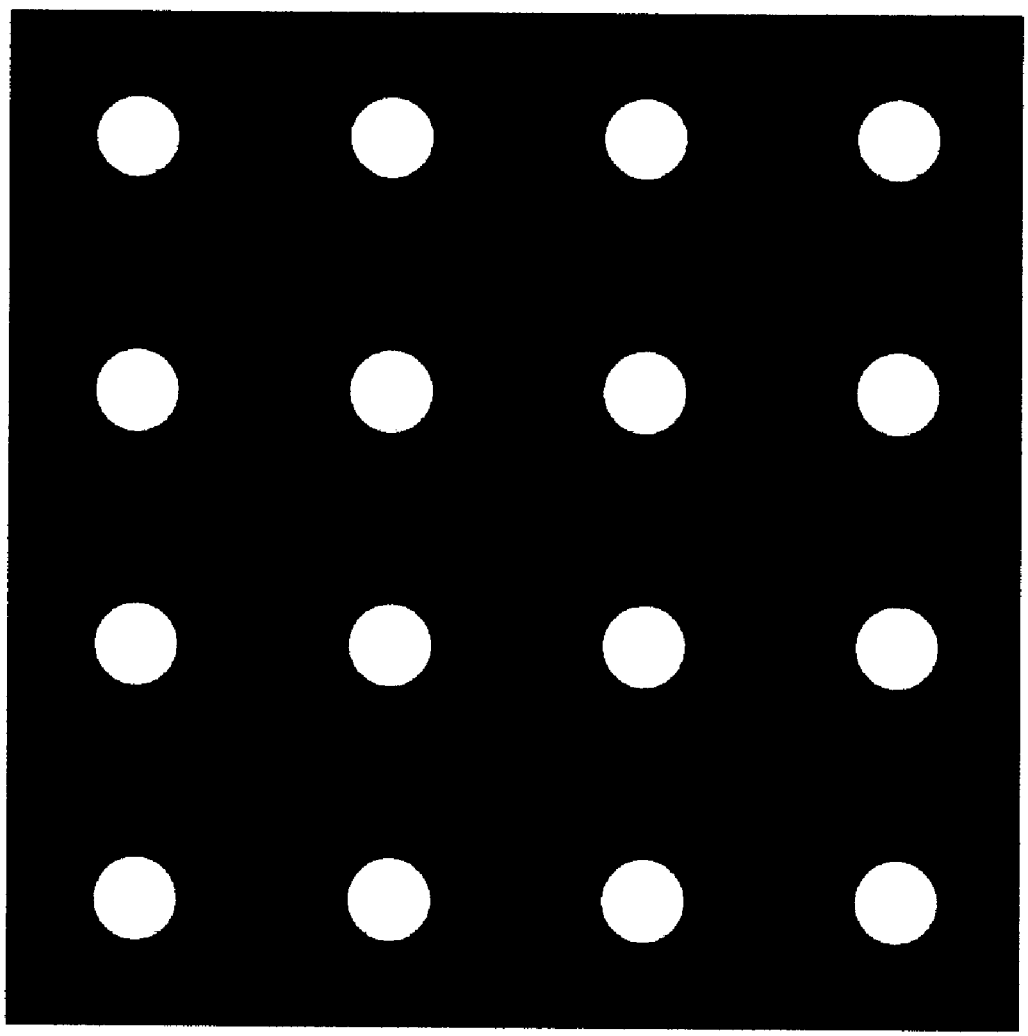
FIG. 1 is an illustration of a negative half-tone screen.
Figure 2:
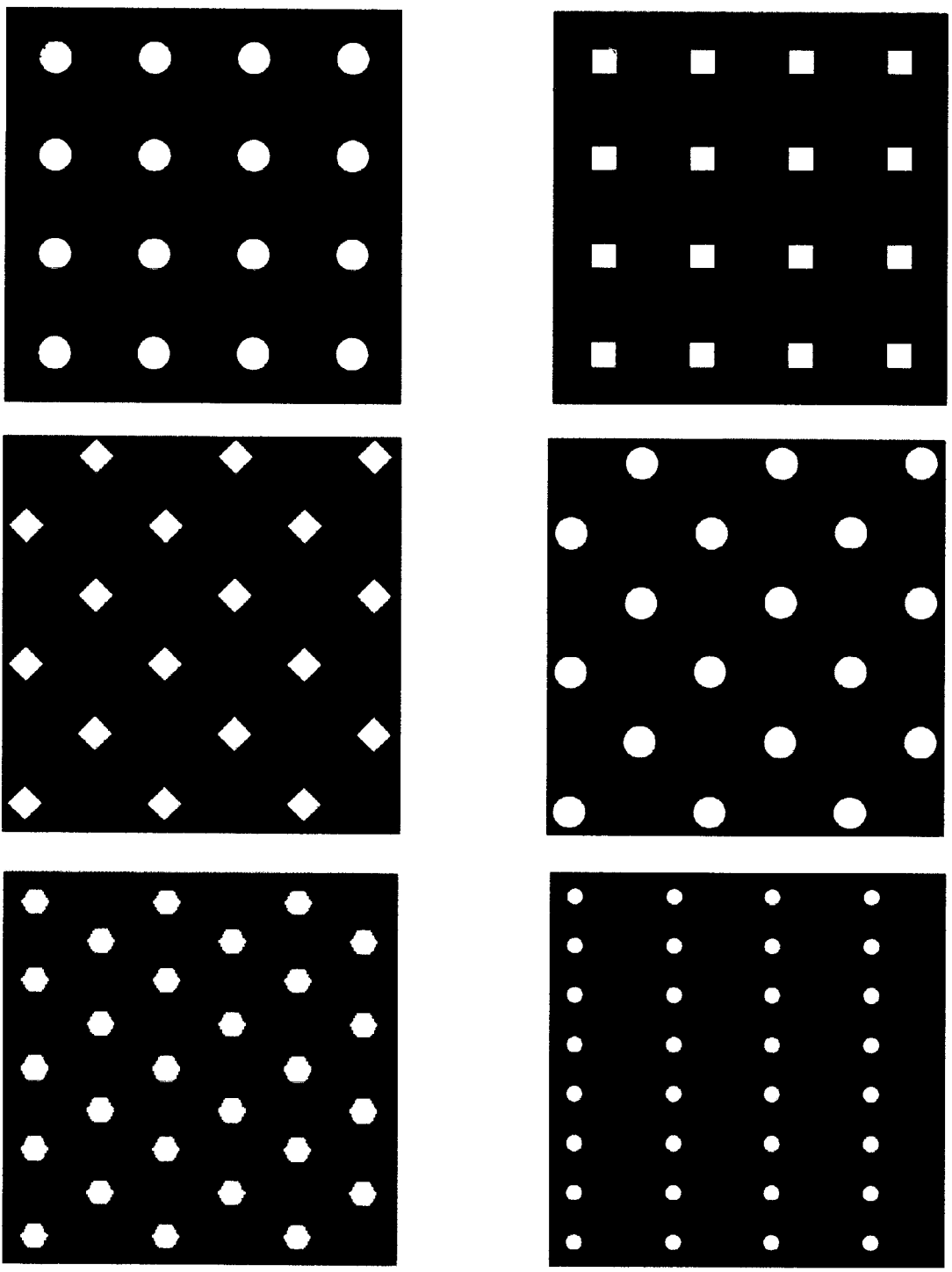
FIG. 2 illustrates various screen configurations, including differently shaped elements arranged in alternate patterns.

The viewing screen used in the preferred embodiment is an array of transparent dots evenly spaced vertically and horizontally, as in a grid, on an opaque surface. Each dot is centered within each grid cell and has a diameter that is less than the width of a grid cell. A suitable screen is an half-tone screen used in the print industry. These screens are specified by frequency and dot size such as a 5% negative half-tone screen at 50 lines per inch which is an array of transparent dots spaced at 0.02". Pitch is defined as 1 divided by the frequency. See FIG. 1 for an enlarged view of an half-tone screen. FIG. 2 shows various configurations that could be used for the screen. The dot shapes shown include round, square, diamond and hexagonal. Different horizontal and vertical dot frequencies are also shown.

A Tru3D™ image is a multi-axis autostereoscopic image consisting of a computer interwoven image of a perspective sequence of source images viewed through a screen, wherein the source images have different respective viewing angles.

Figure 4A:
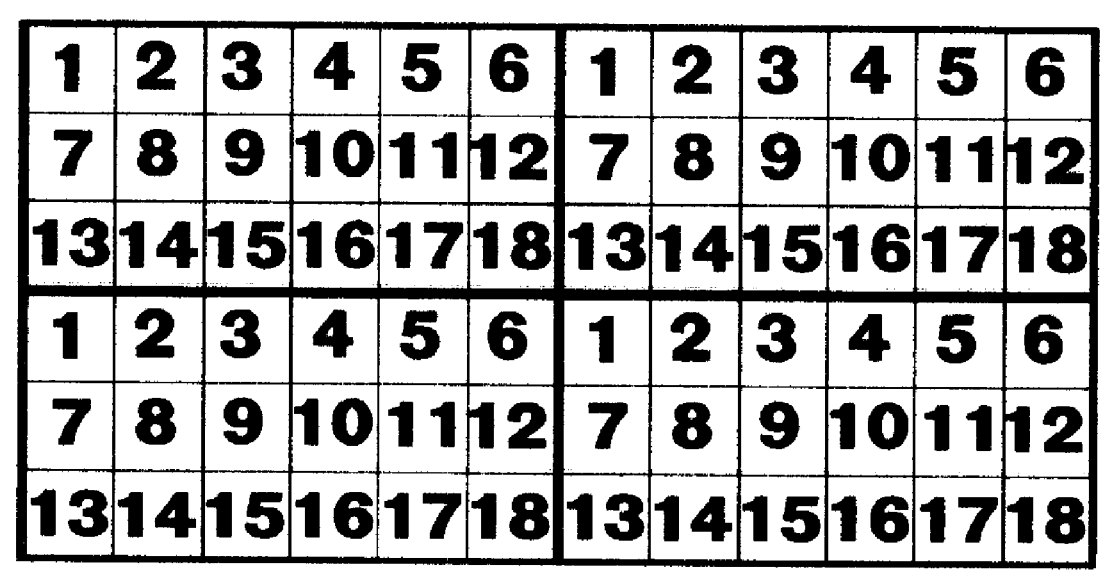
Figure 4B:
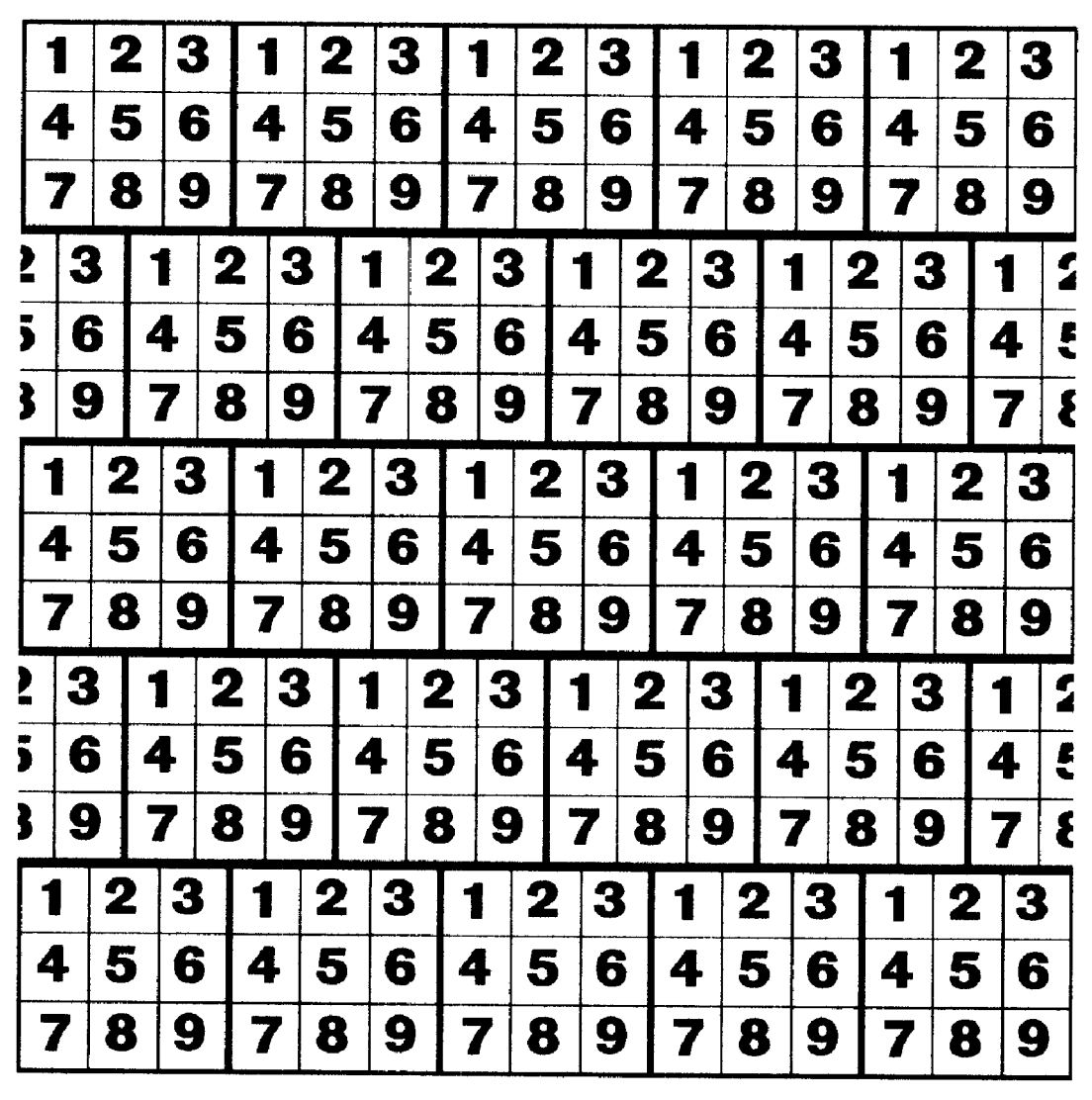
Figure 4C:
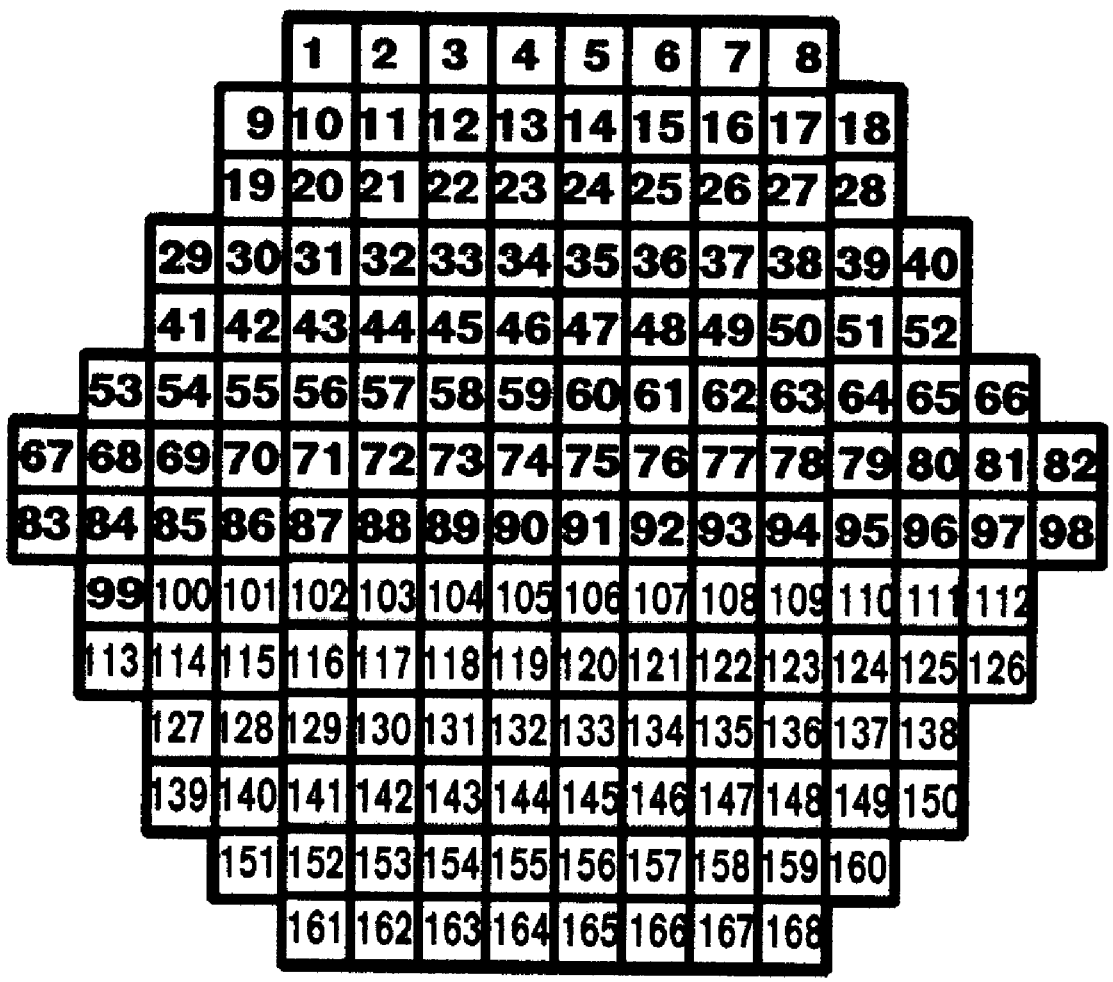
FIG. 4c is an illustration of an interwoven image of a hexagonal cell made from 168 source images.
Figure 4D:
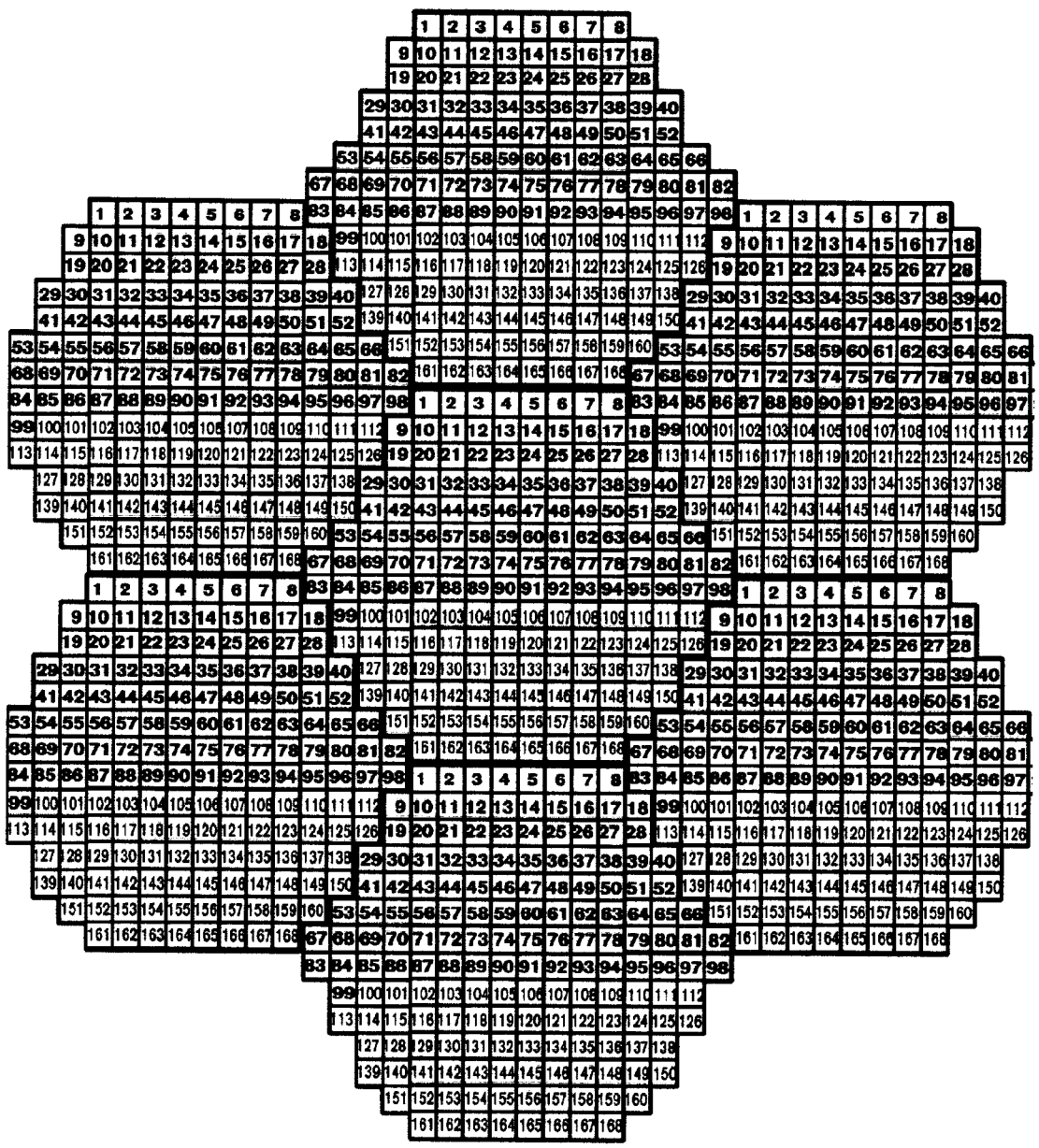
FIG. 4d is an illustration of an interwoven image with hexagonal cells arranged in a hexagonal pattern that can be viewed with a Fly's Eye lens.

A Tru3D™ image of a scene is formed by interweaving a Tru3D™ perspective sequence of source images in a computer memory as an array of cells, each cell subdivided by view elements. The size of the cells correspond to the pitch or frequency of the viewing screen. View elements are obtained by dividing the image information of each perspective view into a matrix at a desired resolution. Selective points in the matrix can then be used as view elements. The number, size, and arrangement of view elements into a cell correlates directly to the configuration of the perspective sequence with each view in the sequence contributing at least one element per cell. FIG. 3 illustrates a two cell by two cell portion of an interwoven image. Each cell consists of nine view elements, labeled 1 through 9, which represent image information from nine perspective views. Alternate image cell shapes are shown in FIGS. 4a and 4b which could be used to compensate for horizontal and vertical pitch differences and/or the viewing screen's dot configuration. The shape of a cell is not limited to the dot shape of the viewing screen. In the preferred embodiment the cell shape is square and the viewing screen's dot shape is circular. Rectangular cell shapes could be used with screens having different horizontal and vertical screen pitches. FIGS. 4c and 4d illustrate the cell shape and configuration respectively of a Tru3D™ image matching a typical hexagonal Fly's-eye lens and demonstrates the complexity of certain configurations.

Figure 5A:
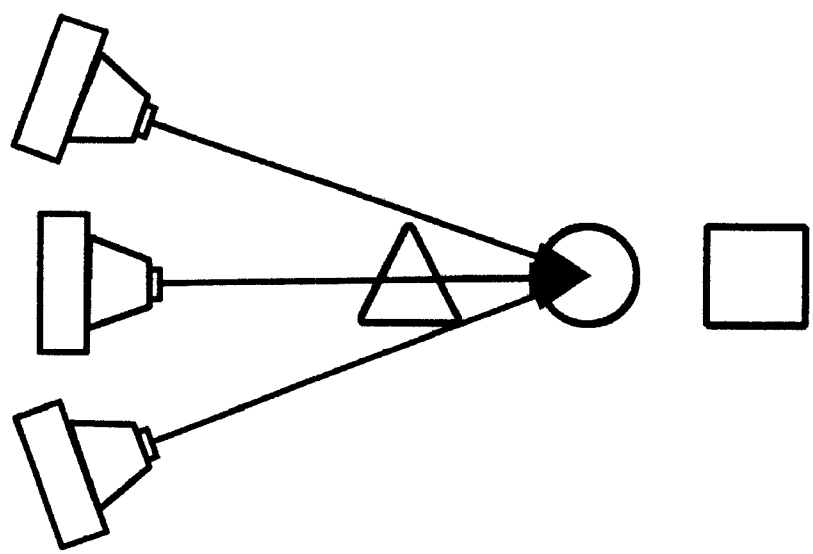
FIG. 5a illustrates a side and top view of an image capture device's positions used in a pivotal perspective sequence.
Figure 5A:
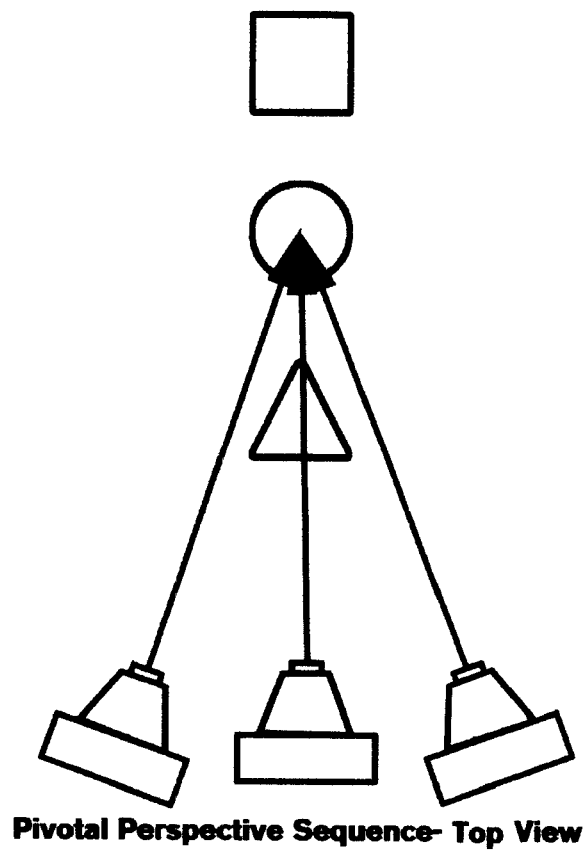
Figure 5B:
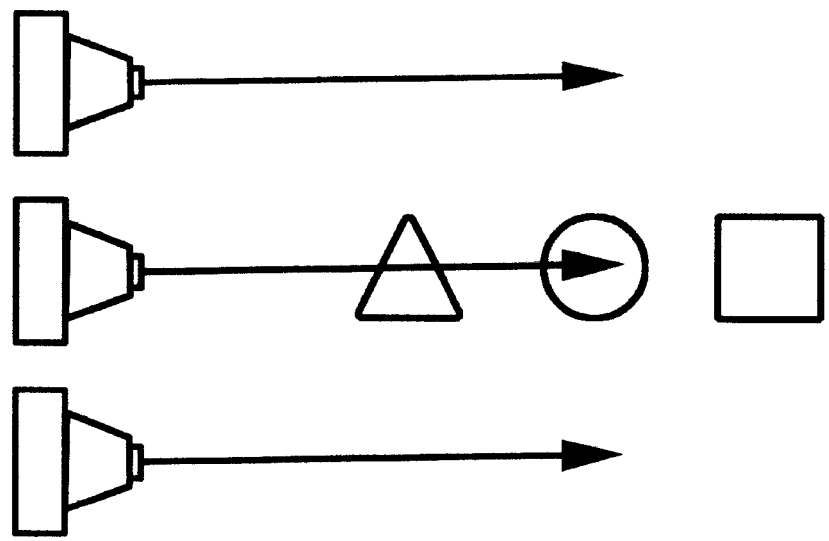
FIG. 5b illustrates a side and top view of an image capture device's positions used in a linear perspective sequence.
Figure 5B:
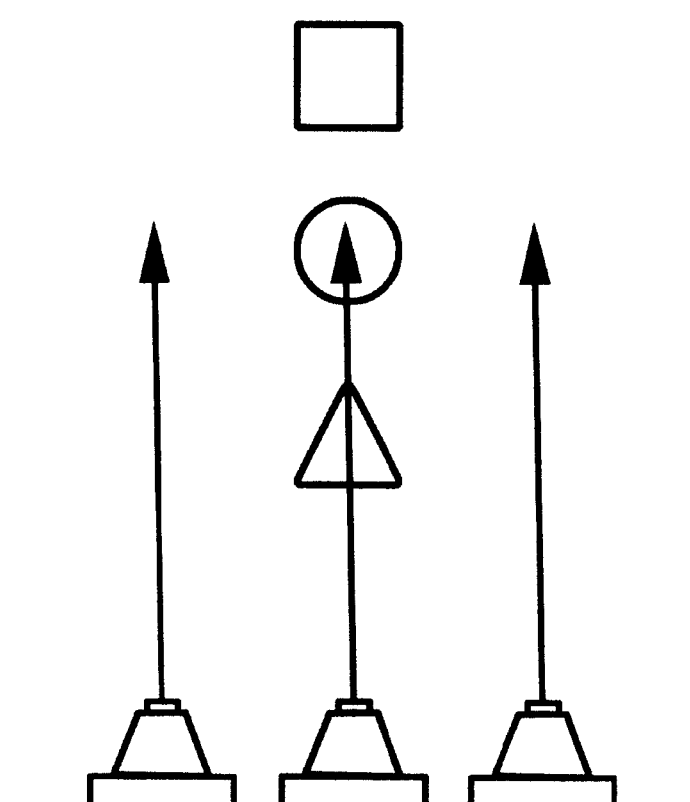
Figure 6:
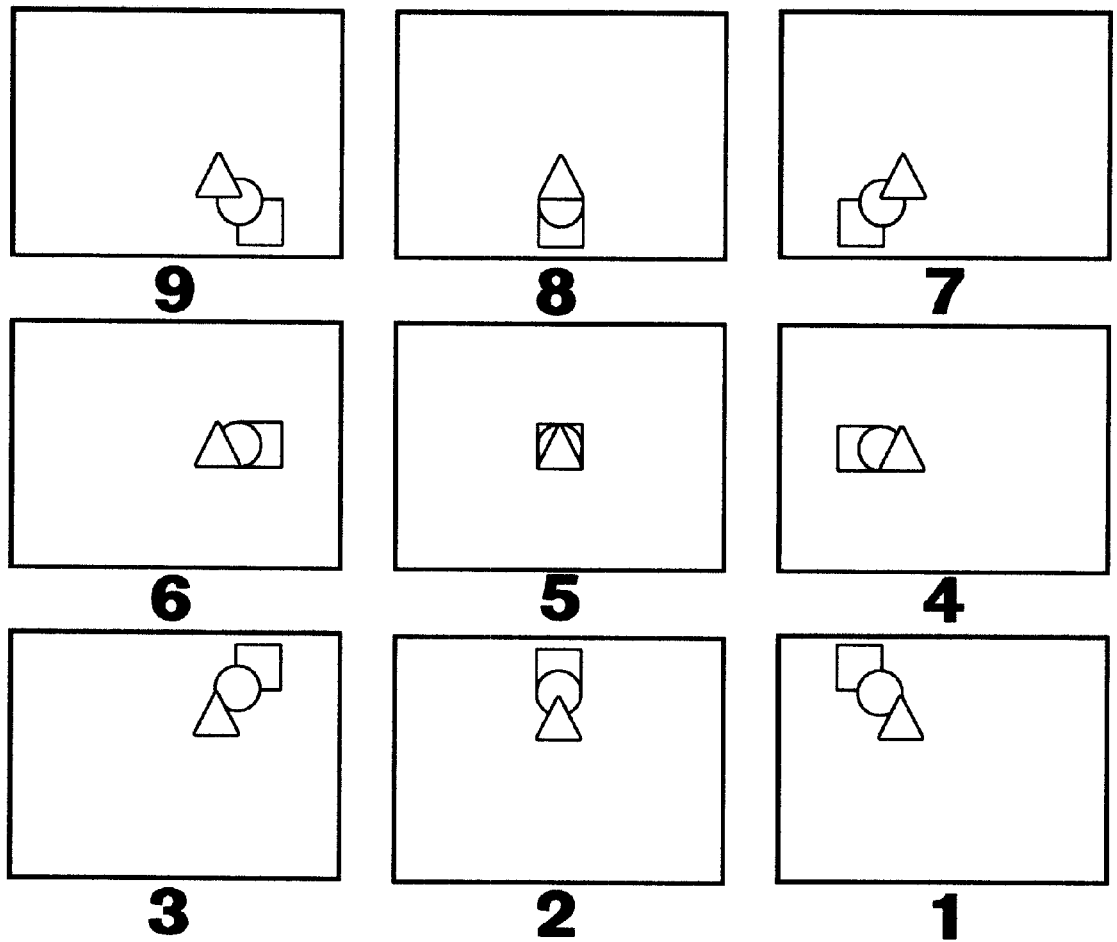
FIG. 6 illustrates nine linear perspective views captured from a three by three array of perspective locations.
Figure 7A:
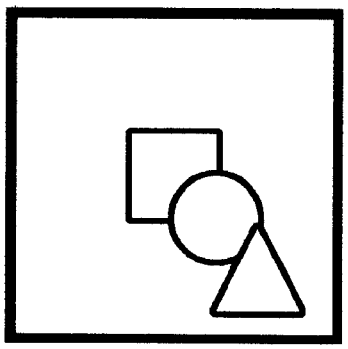
FIG. 7a illustrates the nine linear perspective views realigned so that the square is the aim point.
Figure 7A:
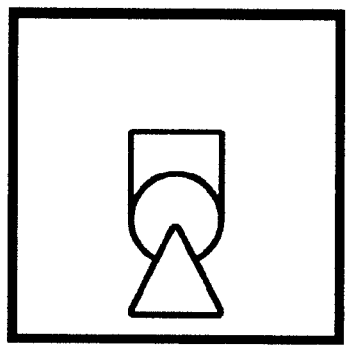
Figure 7A:
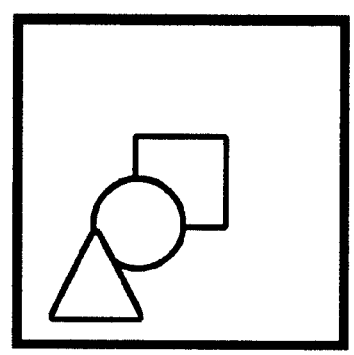
Figure 7A:
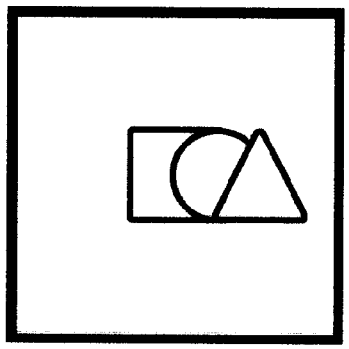
Figure 7A:
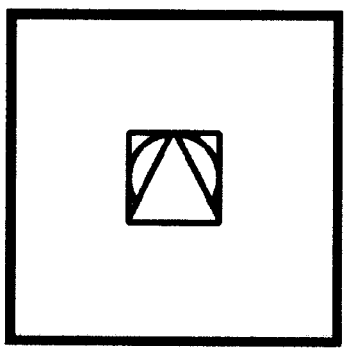
Figure 7A:
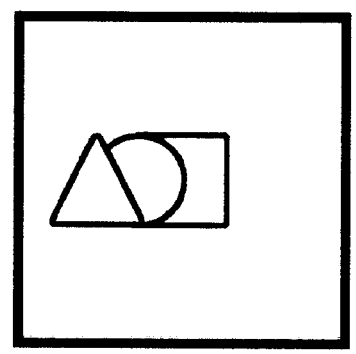
Figure 7A:
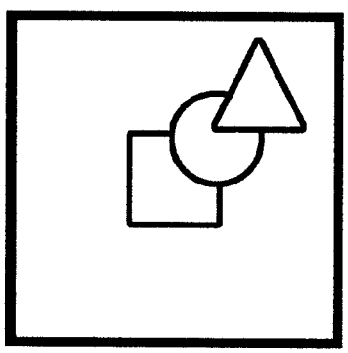
Figure 7A:
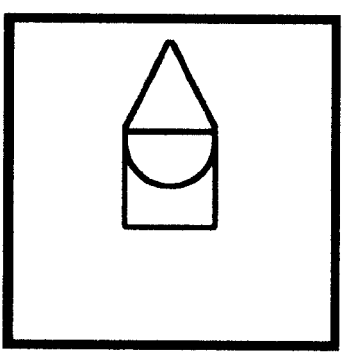
Figure 7A:
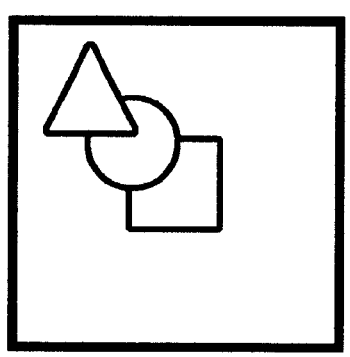
Figure 7B:
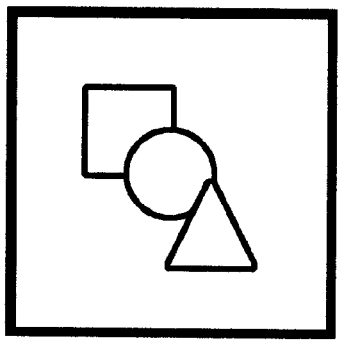
FIG. 7b illustrates the nine linear perspective views realigned so that the circle is the aim point.
Figure 7B:
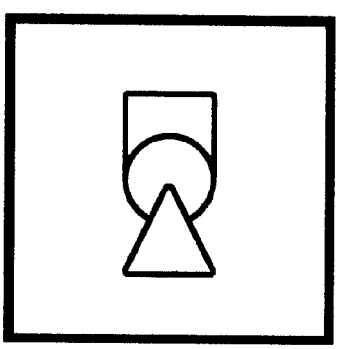
Figure 7B:
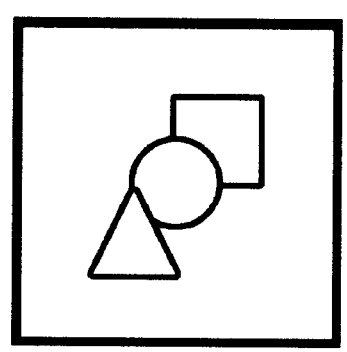
Figure 7B:
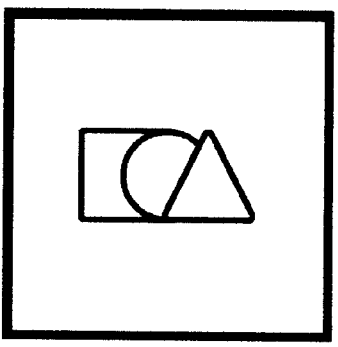
Figure 7B:
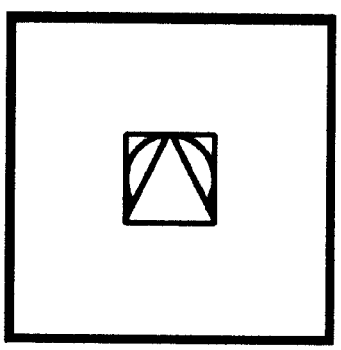
Figure 7B:
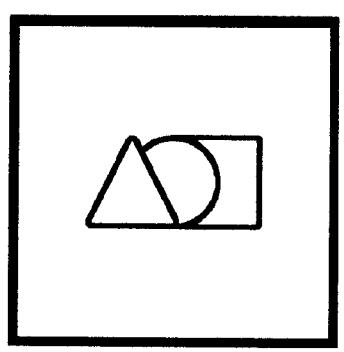
Figure 7B:
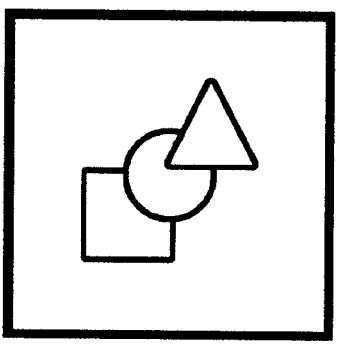
Figure 7B:
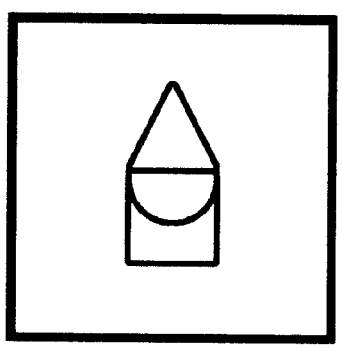
Figure 7B:
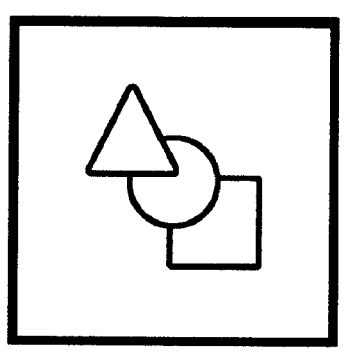
Figure 7C:
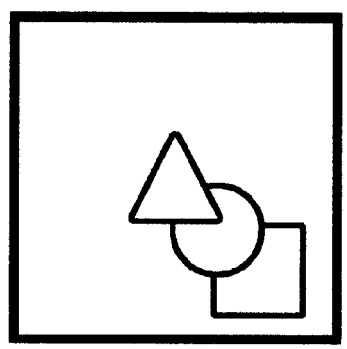
FIG. 7c illustrates the nine linear perspective views realigned so that the triangle is the aim point.
Figure 7C:
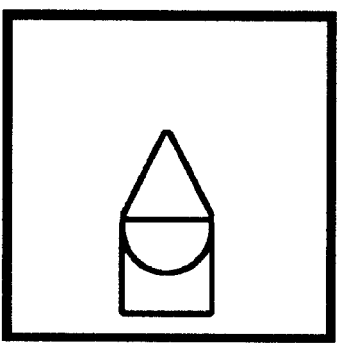
Figure 7C:
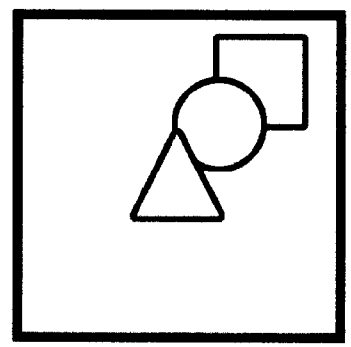
Figure 7C:
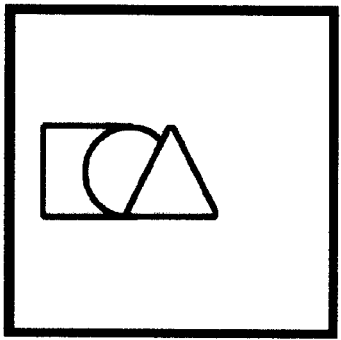
Figure 7C:
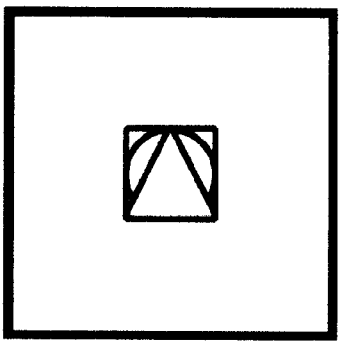
Figure 7C:
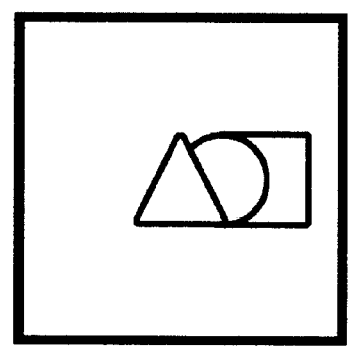
Figure 7C:
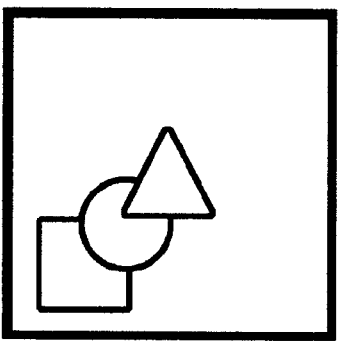
Figure 7C:
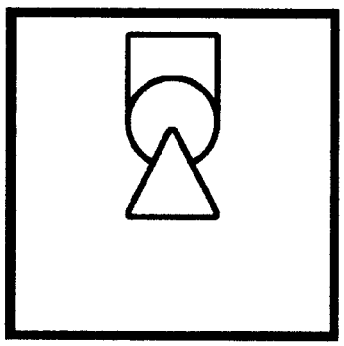
Figure 7C:
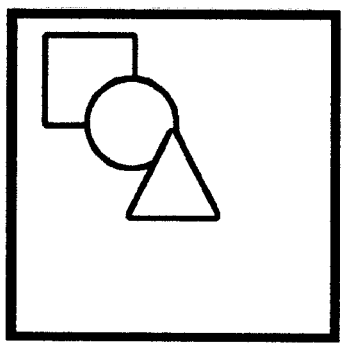

A Tru3D™ perspective sequence contains all the visual information that will be used in the interweaving process. It is a sequence of source images which are viewed from different viewing angles. Each view is captured from the perspective of a discreet location in an array of locations, i.e., a specific viewing angle. These locations need not reflect a chronological order. A perspective sequence can be achieved with a single image capture device and a multi-axis positioning stage by two methods. The simplest method, illustrated in FIG. 5a, is to pivot the image capture device during the sequence so that a predetermined x,y,z coordinate in the scene, called the aim point, maintains a stationary position in the composition of the scene. This aim point will appear in the final Tru3D™ image to be positioned at the surface of the viewing screen. All other objects in the scene will appear to either recede or project spatially from this point. There are some draw backs to this method, however. The image depth can sometimes appear unrealistic as the object in the scene will seem to rotate around the aim point. Also in this method, the aim point must be determined at the time of capture and cannot be adjusted or repositioned at a latter time. An alternate method, illustrated in FIG. 5b, yields a more realistic final image and has the versatility of aim point adjustment within a scene. In this method, the image capture device maintains a perpendicular orientation to the scene throughout the sequence. At this point all objects will have a slightly different spatial relation to each other that is unique to each perspective view as shown in FIG. 6. Should the sequence be interwoven all objects will appear to project from the surface of the viewing screen except a theoretical point at infinity. This point currently is the aim point and appears at the surface of the viewing screen. To place the aim point within the scene, a secondary pan/tilt compensation is employed. In this step, a desired x,y,z point is chosen in the scene. Each perspective view is then realigned or reregistered so that this point maintains a stationary position within the composition. This process is similar to image stabilization techniques used in the motion picture and video industry. Interweaving this modified sequence will result in the chosen aim point appearing to coincide with the surface of the viewing screen, and all other objects will generally appear behind or in front of this point. It should be noted that both methods can also be achieved with multiple image capture devices positioned in an array of locations. FIGS. 7A, 7B and 7C show several realignments of the sequence from FIG. 6. The virtual center in each sequence has been set to the square, circle and triangle respectively.

Figure 8:
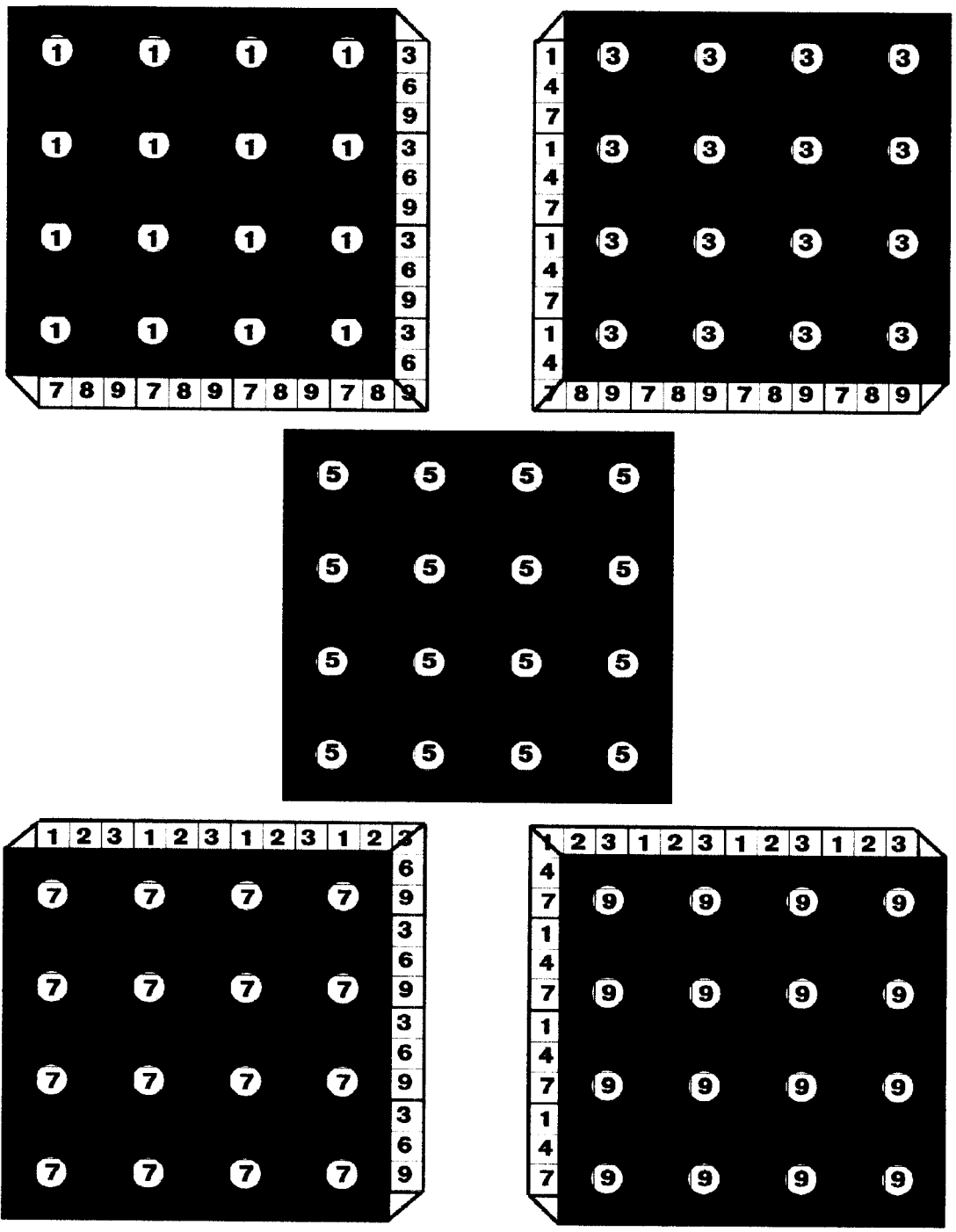
FIG. 8 is a perspective view of a viewing screen and the underlying interwoven image.

Viewing the interwoven image of the Tru3D™ perspective sequence thus formed through the described screen in proper alignment results in a multi-axis three-dimensional image. The screen is positioned a known distance from the interwoven image and illuminated from behind. The screen acts as a filter presenting only one set of view elements at a viewing angle. Since the eyes are separated by the interocular distance and there is a space or spacer between the screen and interwoven image, each eye sees a different set of view elements resulting in a stereoscopic effect. FIG. 8 shows a close up perspective view of a viewing screen and the underlying interwoven image. Each view is shown from a perspective that corresponds to the position from which the view was captured. It is important to note that the view elements of a cell are positioned during the interweaving process such that the arrangement of the view elements within each cell are the inverse of the coordinates of the perspective locations. If the inversion of elements and locations is not performed a pseudoscopic image will be formed.

Figure 9:
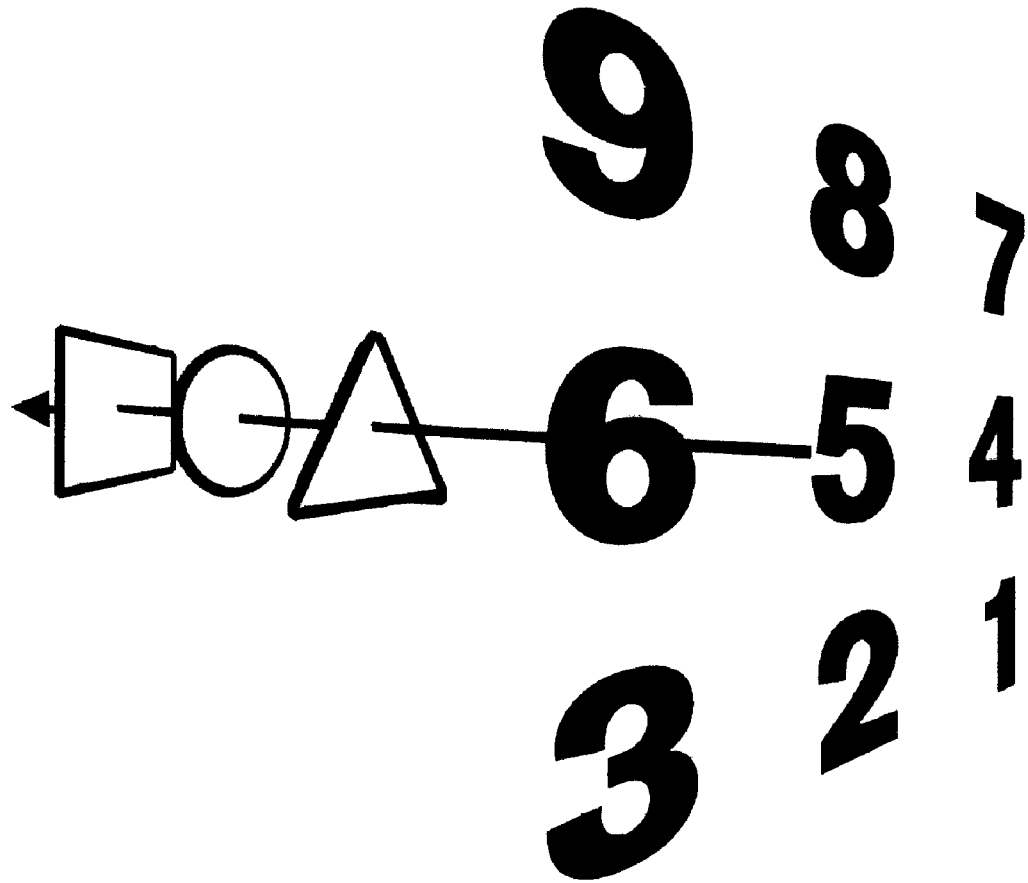
FIG. 9 is a perspective view of the coordinates of the array of capture locations and objects used to make a perspective sequence.

The formation of an interwoven image in a computer memory is dependent upon several factors. The frequency, dot size and dot shape of the viewing screen are matched with the horizontal and vertical number of views in a Tru3D™ perspective sequence. In this example, the screen is a 5% negative half-tone screen at 50 lpi, commonly available in the print industry. The Tru3D™ perspective sequence is based on a three by three array of perspective views yielding a cell of nine view elements. Each element in the cells of the image can be represented by one or more pixels, i.e. picture elements. A resolution for the interwoven image is chosen as a function of the screen pitch times the number of horizontal or vertical elements times the pixels per element. One pixel per element would require a resolution of 50 lpi times 3 elements times 1 pixel per element for 150 pixels per inch. A view element of two by two pixels gives a resolution of 50 times 3 times 2 for 300 pixels per inch. Each view in the sequence is converted to the desired resolution and logically divided into a matrix of elements grouped as 3 by 3 element cells. Selective pixels are copied from each cell of each view to a storage area reserved for the interwoven image. Pixels are selected as every third pixel horizontally and vertically or as blocks of two by two pixels separated by four pixels horizontally and vertically. The selected pixels are copied to the interwoven image so that pixels corresponding to view elements are arranged in an inverse order to that of the locations used to capture the perspective sequence of source images. When selecting pixels to copy there are some additional considerations relative to the coordinates of the selected pixels and the coordinates they are copied to in the interwoven image. One method is to select pixels to copy from each image that correspond to the same view element and place them in the interwoven image in an offset relation relative to the coordinates they were copied from. Alternately, the selected pixels can correspond with the view element coordinates that they are copied to in the interwoven image. Either method can be accomplished using digital image manipulation/compositing techniques that can be implemented using software such as Adobe Photoshop, Corel Draw, Adobe Illustrator, Macro Media Freehand, Adobe After Effects, Discrete Logic Flame or InSync Razor Pro. FIG. 9 illustrates the coordinates of the array of locations used to capture the frames of the perspective sequence while FIG. 3 illustrates the location of view elements within a set of cells. An interwoven image thus formed is output and viewed through the half-tone screen and illuminated from behind. In the preferred embodiment the resolution of the interwoven image is increased to match the output device, such as 720 dpi used by the Epson Stylus 800 inkjet printer or 1000 dpi used by the Kodak Premier film recorder. The resolution could be decreased, although the results would be inferior. It should be noted that the interwoven image pattern has a cell pitch approximately matching that of the viewing screen and by increasing or decreasing the pitch slightly the viewing distance and/or space between the viewing screen and interwoven image can be adjusted.

Unlike known methods of interlacing or interweaving image elements, this method of the present invention does not require the tracking of distance information in electronically captured source images.

Figure 10:
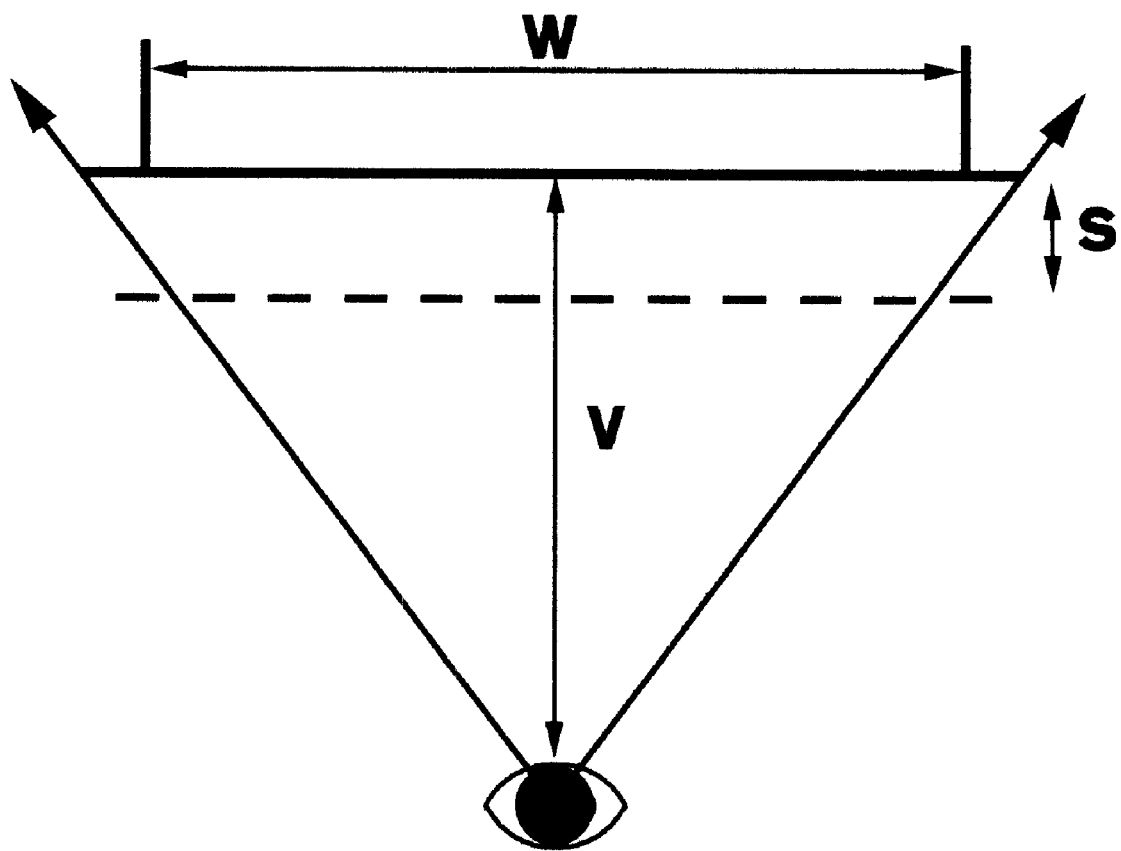
FIG. 10 illustrates the relationship between the viewing distance, screen width and the space between the viewing screen and the interwoven image.

FIG. 10 illustrates the relationships between the viewing distance, screen width and the space between the viewing screen and the interwoven image. For example, an image that is 9 inches in width with a spacer of 0.12 inches is to be viewed from a distance of 36 inches. The following calculations can be used to determine the numerical relationship known as the Adjustment Factor.

W=screen width
S=spacer thickness
V=viewing distance
AF=Adjustment Factor
AF=((W12)+(((W/2)V)*S))/(W/2)=(1+SV), where the values are measured in inches e.g. 1.0033333=(((9/2)+(((9/2)/36)*0.12))/(9/2)), The numerical Adjustment Factor defines the proportional relationship of the viewing screen's dot pitch/frequency and the interwoven image's cell pitch/frequency. To calculate the pitch or frequency required to match a selected screen and view distance with an interwoven image the following formulas apply.

F=Frequency of viewing screen dot
P=1/F=Pitch of viewing screen dot
CF=Interwoven Image Cell Frequency
CP=Interwoven Image Cell Pitch $CF=F/AF$ e.g. 49.745744=50/1.0033333

$CP=P*AF$ e.g. 0.0200666=0.02*1.0033333

Figure 11:
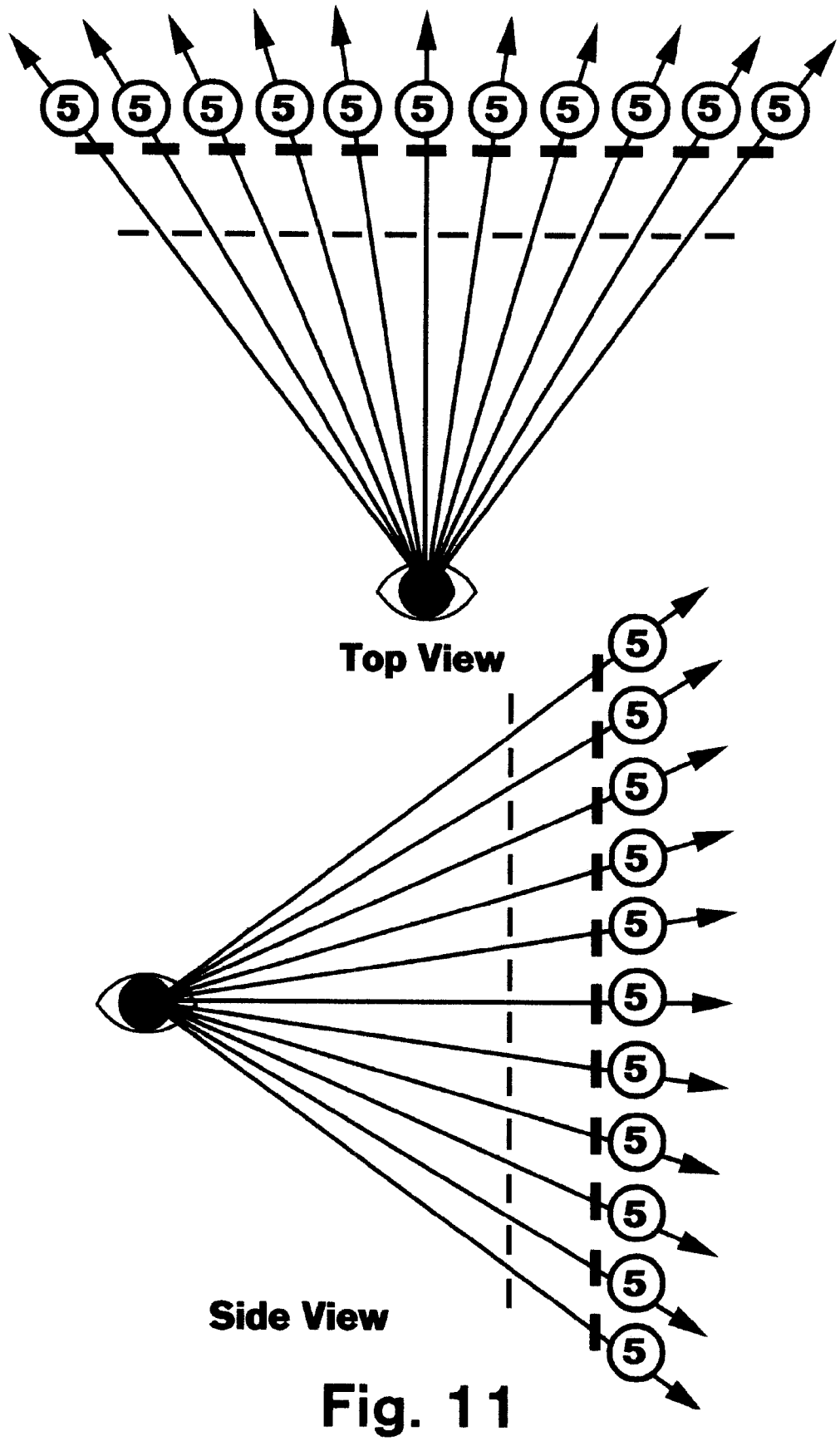
FIG. 11 illustrates the top and side views of an interwoven image with a cell pitch/frequency that matches the selected view distance.

FIG. 11 illustrates the top and side views of an interwoven image with a cell pitch/frequency that matches the selected view distance. The illustration shows that only the desired like cell elements of view five are observed through the transparent areas of the screen at the selected view distance, spacer thickness, screen dot pitch/frequency and interwoven image cell pitch/frequency. In the example, the interwoven image could be created using a cell frequency of 50 lpi and a width of 8.97009 inches. Enlarging the interwoven image by the adjustment factor of 100.33333% would result in a 9 inch wide image with a cell frequency of 49.745744 lpi.

These calculations are valid if the variables supplied are in fact exact representations of the materials used. For instance, the frequency of the screen may actually be 50.4 or the thickness of the spacer could be 0.125 inches thereby requiring a slightly different interwoven image cell frequency. The interwoven image cell frequency can also be affected by the image reproduction process. In the case of a film recorder, the resolution of the device may be specified as 1000 dpi when in fact it is 999.99 dpi, or the process of developing the film could cause a slight deviation in the dimensions of the film base which would further alter the frequency of the interwoven image. Compensation for these slight deviations can be determined to adjust for these situations. The compensated adjustment factor can be applied to the formulas as a whole or applied to individual variables. In the preferred embodiment the compensated adjustment factor is applied to the interwoven image data in the form of resolution changes, i.e. changing the image data's dpi to match the dpi of the output device, and/or changing the dimensions of the image data, i.e. reducing or enlarging the image.

Figure 12:
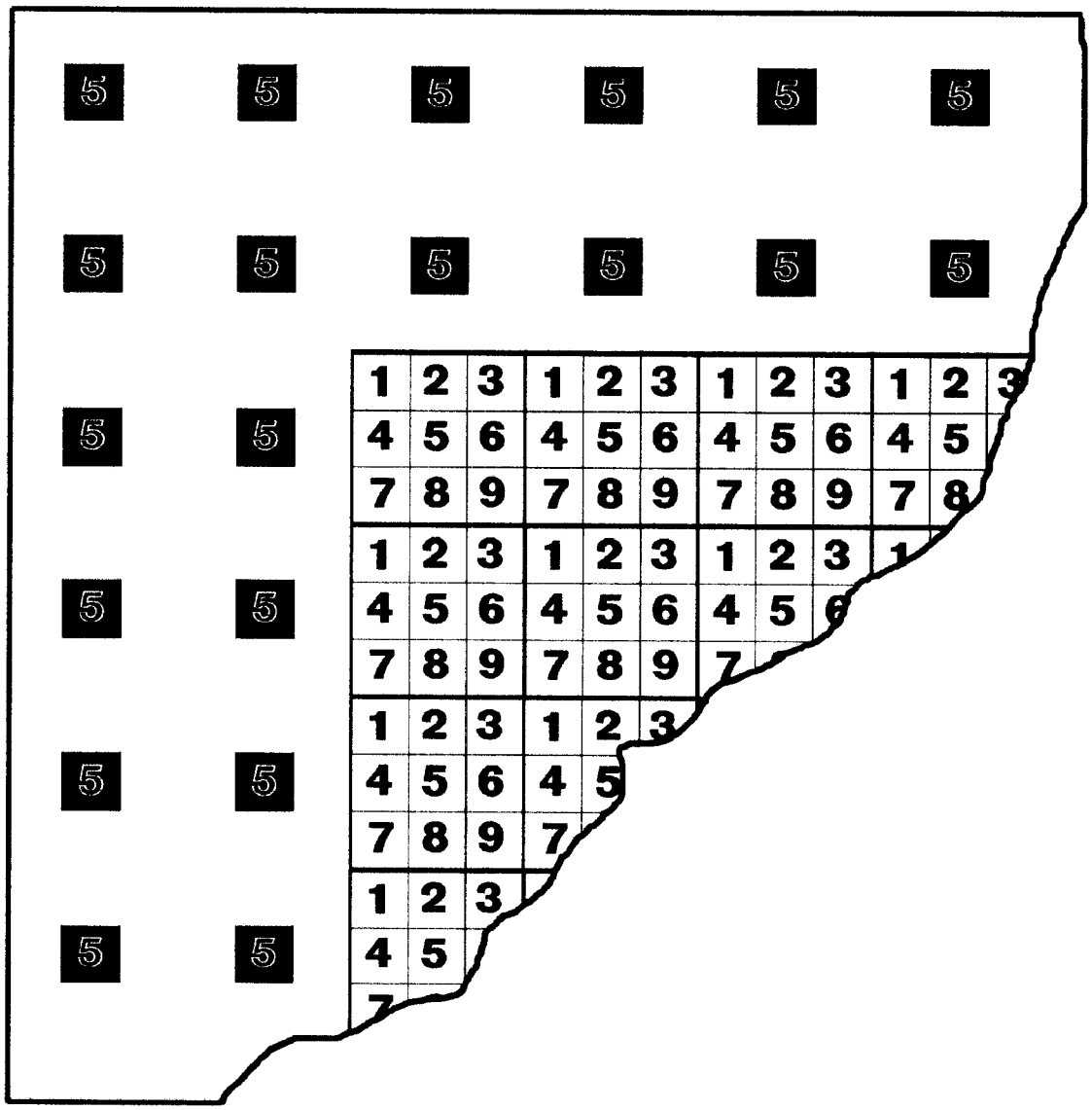
FIG. 12 illustrates a portion of an interwoven image with an alignment pattern.
Figure 13:
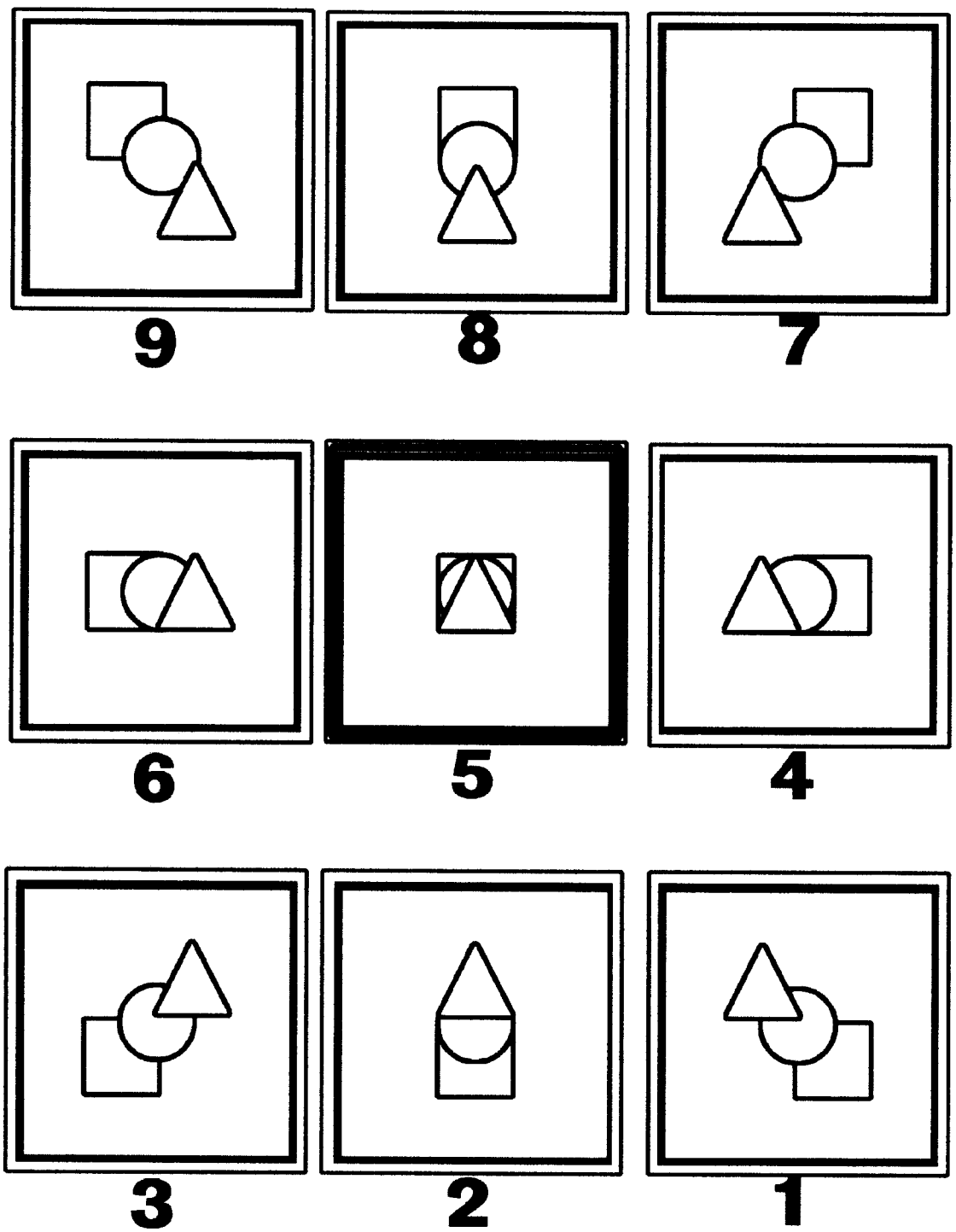
FIG. 13 illustrates a perspective sequence with a black border added to the center view and a white border to the other views.
Figure 14A:
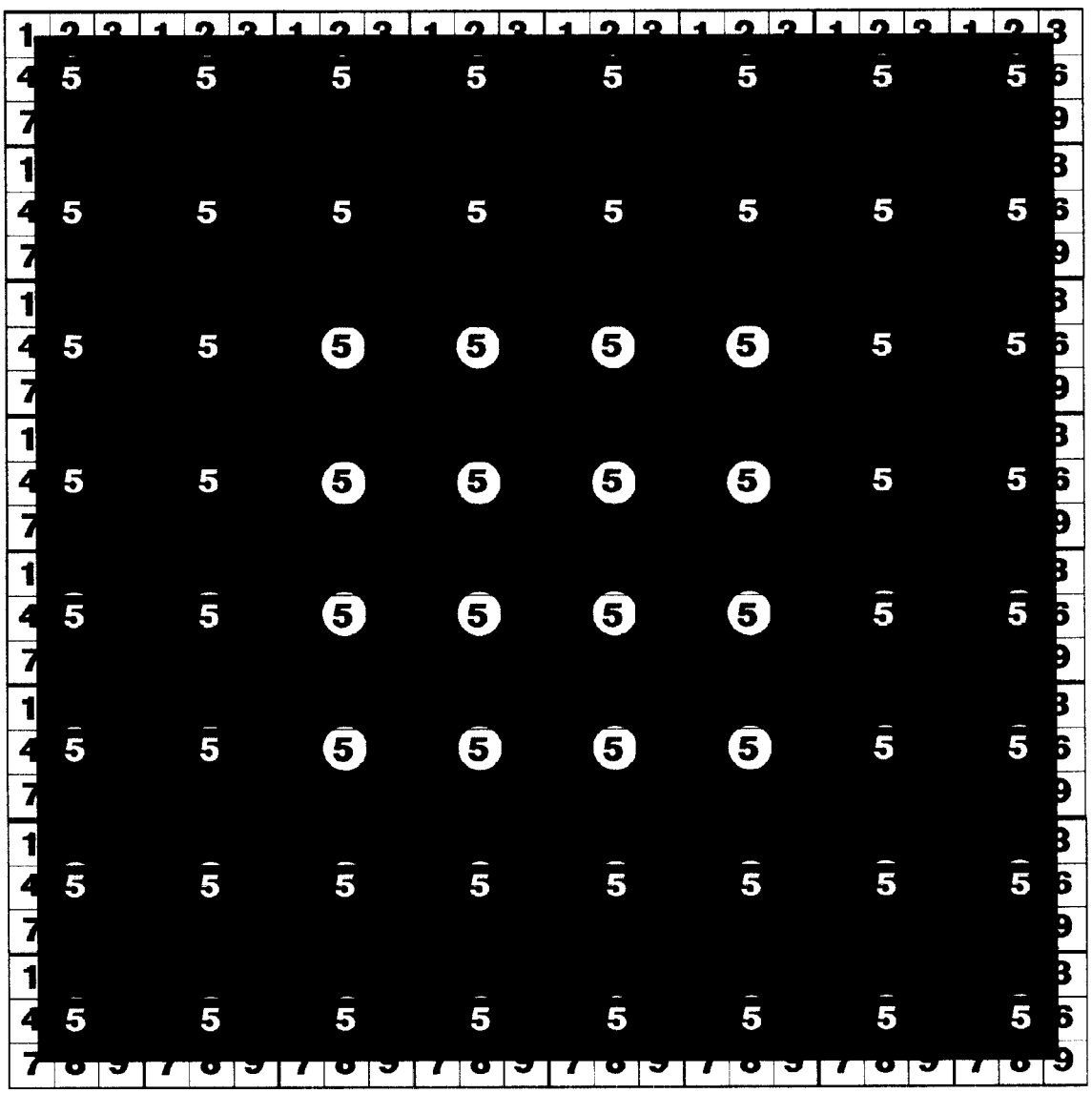
FIG. 14a illustrates a screen in alignment with element five of the underlying interwoven image.
Figure 14B:
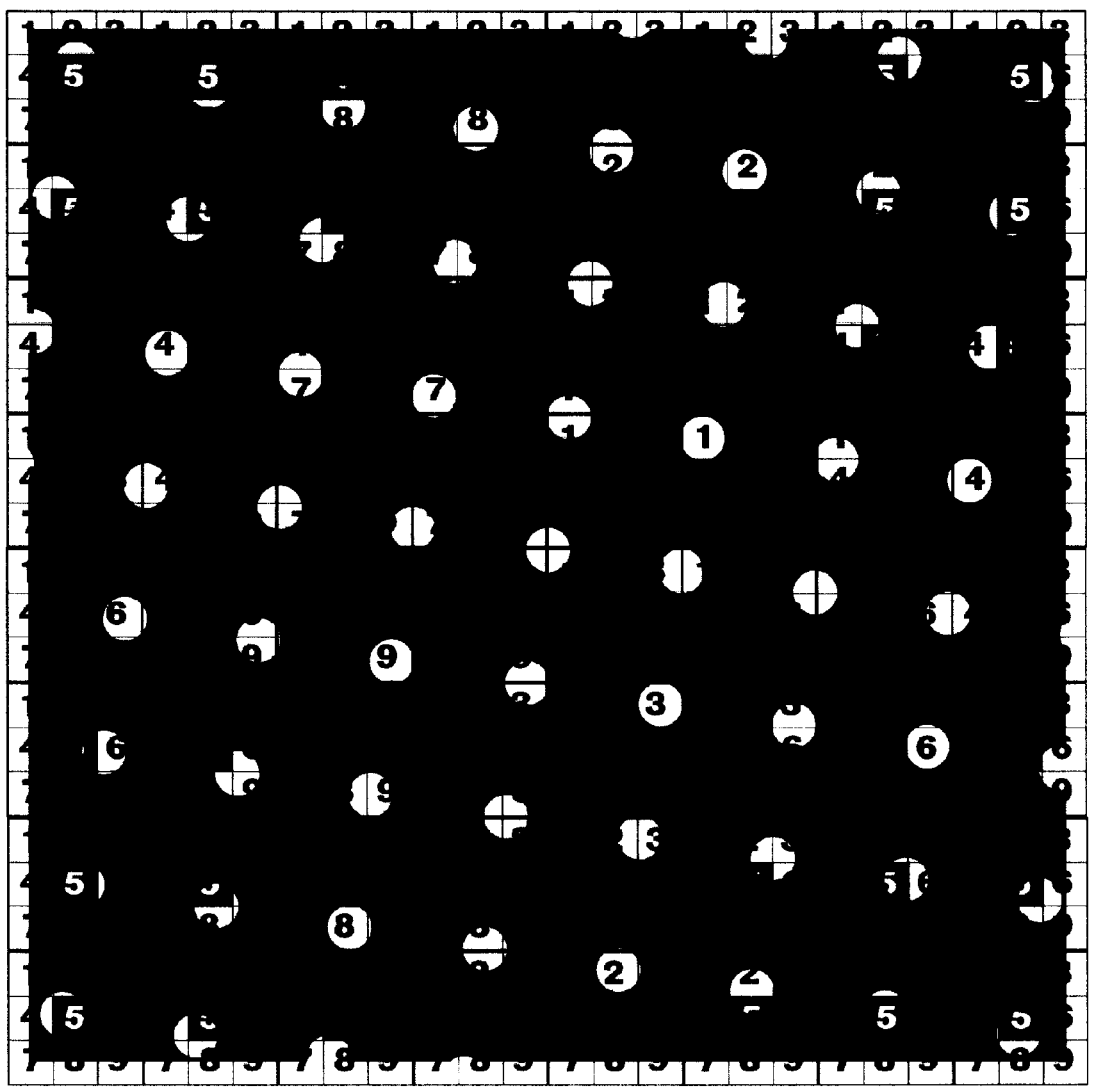
FIG. 14b illustrates a screen misaligned clockwise to element five of the underlying interwoven image.
Figure 14C:
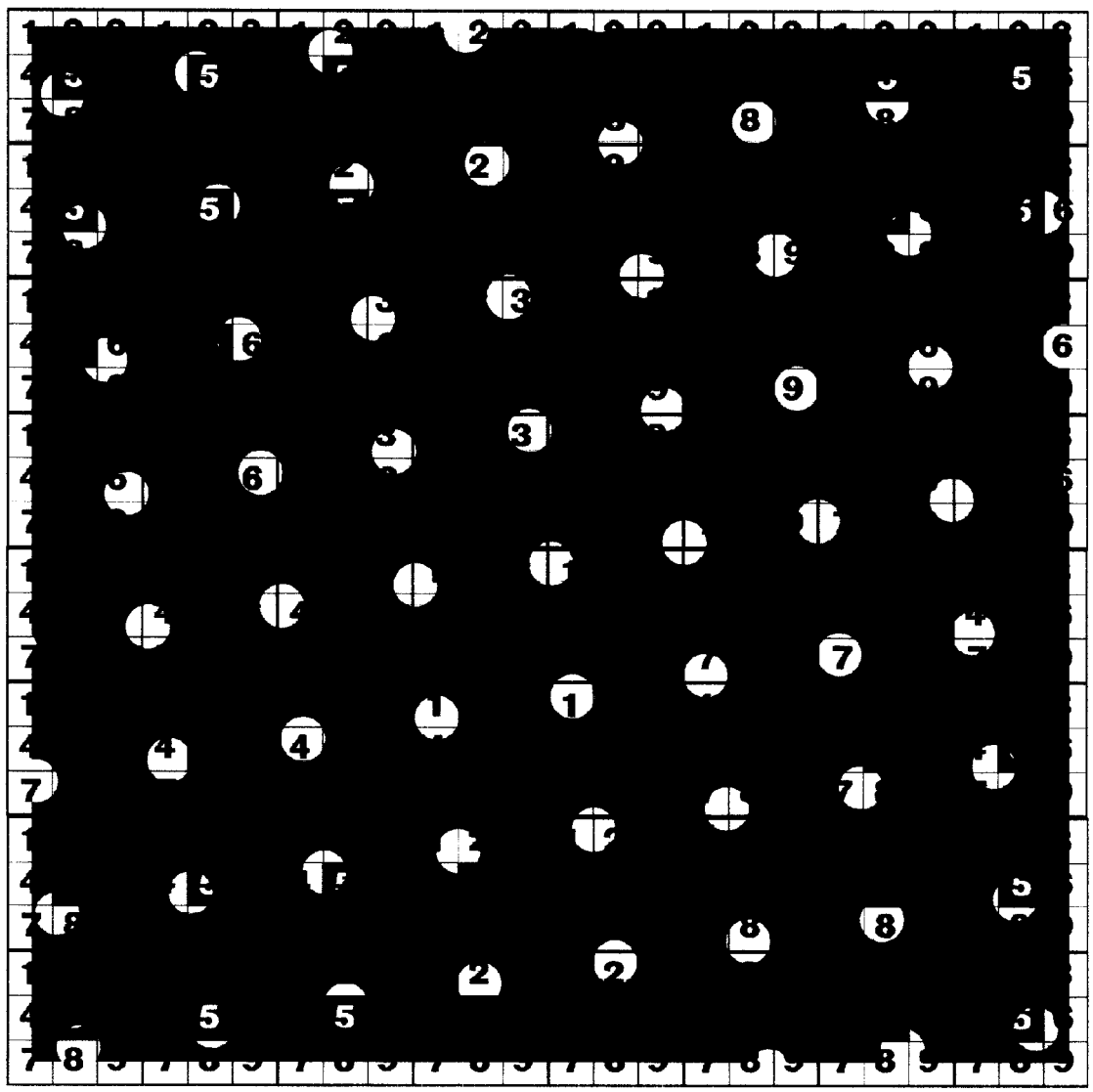
FIG. 14c illustrates a screen misaligned counter clockwise to element five of the underlying interwoven image.
Figure 15A:
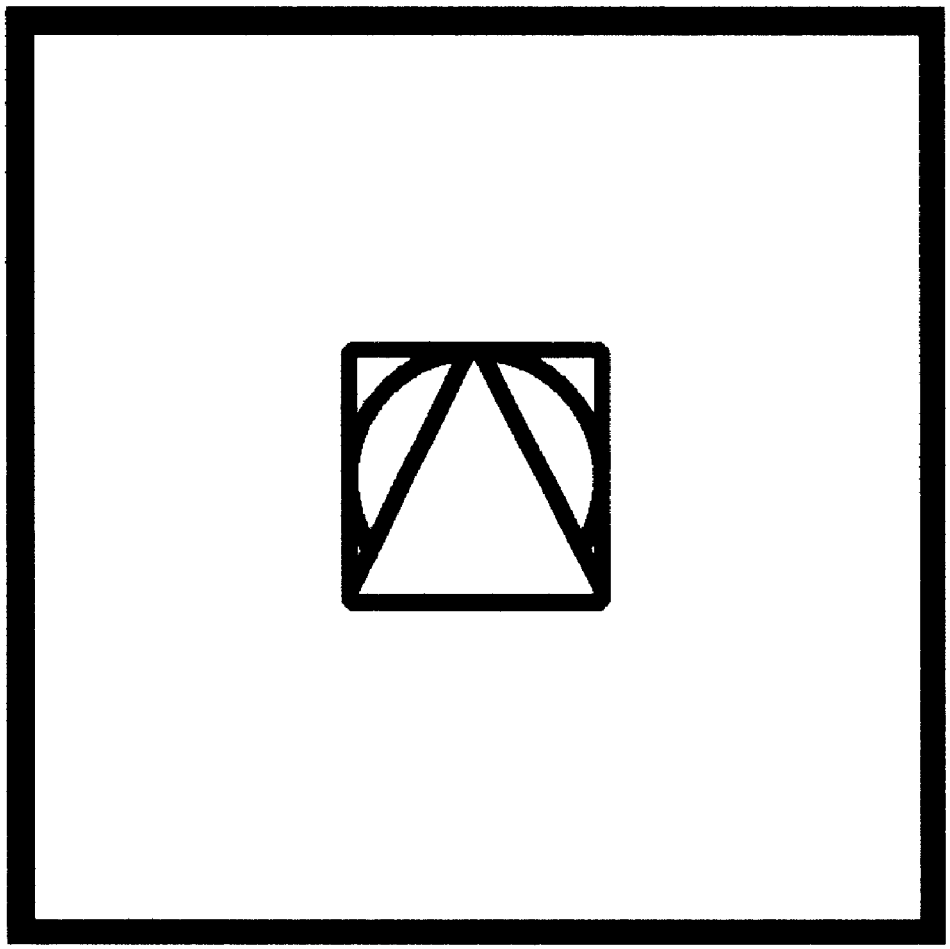
FIG. 15a illustrates an observers view when the screen is properly aligned.
Figure 15B:
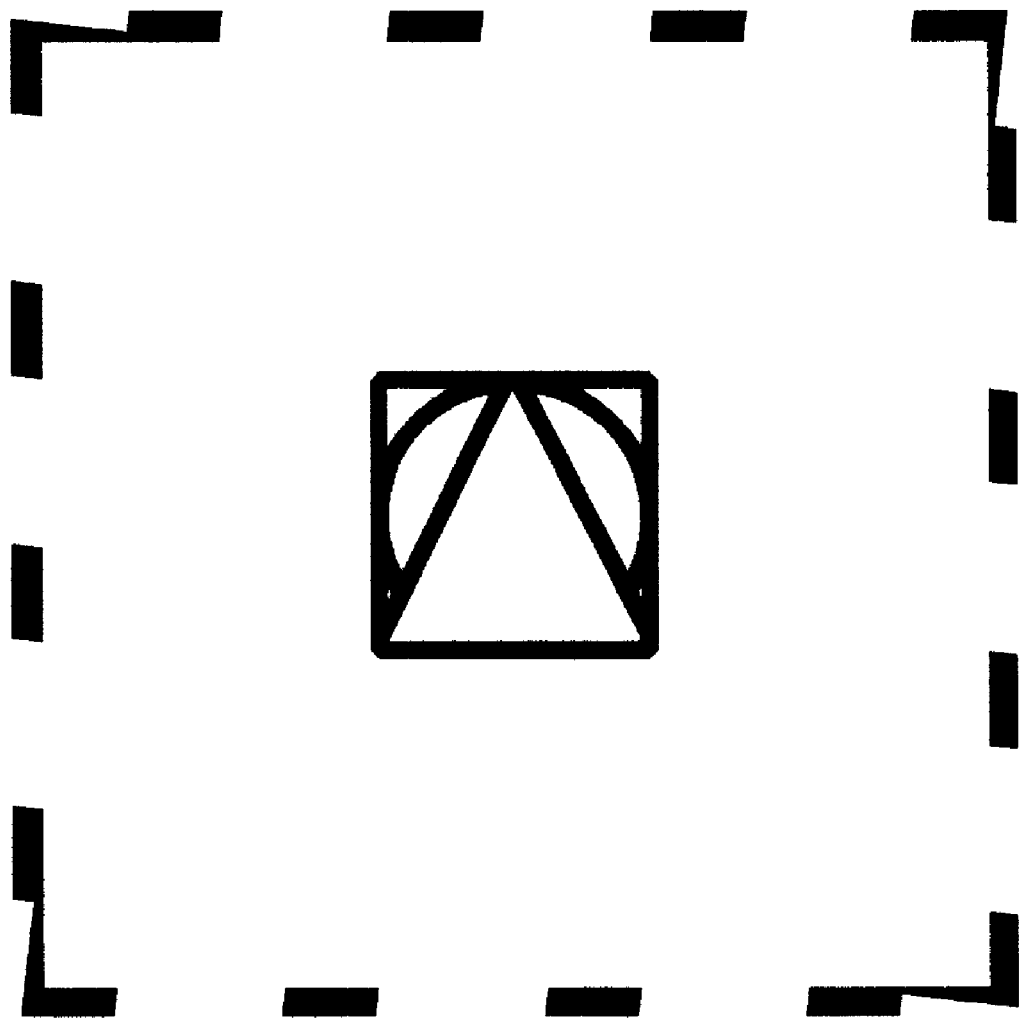
FIG. 15b illustrate an observers view when the screen is misaligned clockwise.
Figure 15C:
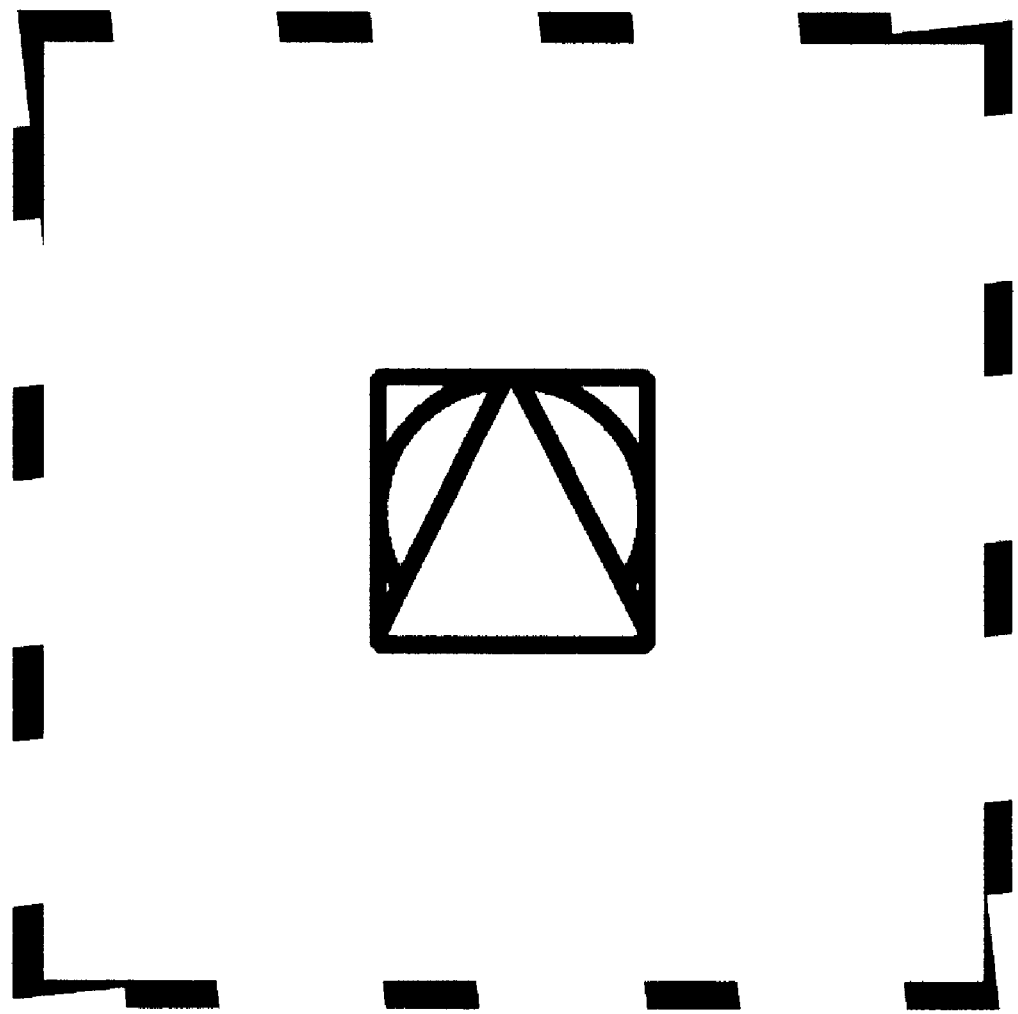
FIG. 15c illustrate an observers view when the screen is misaligned counter clockwise.

Aligning the interwoven image with the viewing screen is crucial to the success of the Tru3D™ image. This alignment can be accomplished using an alignment border. This border is a pattern of minute images, such as dots, squares or ovals, that correspond to the position of a known view element in the interwoven image as shown in FIG. 12. The pattern can be created by adding a black border to a selected view or views in the Tru3D™ perspective sequence of images or views, and a white border to one or more of the other views before interweaving as shown in FIG. 13. Alternately, the pattern can be created separately. Typically the pattern is aligned with the center view element or elements. A suitable viewing screen is placed at a known position from the interwoven image and observed from an angle corresponding to the location of the black bordered view. When the image and screen are aligned, the border is all black at the selected viewing distance. Moving left to right and/or top to bottom causes the border to change to all white indicating that the image is at the proper pitch. FIG. 14a illustrates a screen in alignment to the view elements of position five with the black border. FIGS. 14b and 14c illustrate misaligned screens that are rotated clockwise and counter clockwise to the interwoven image. FIG. 15a shows the observer's view when the screen is aligned as described. FIGS. 15b and 15c represent the observer's view when the screen is misaligned by rotating the screen clockwise and counter clockwise relative to the interwoven image.

Figure 16A:
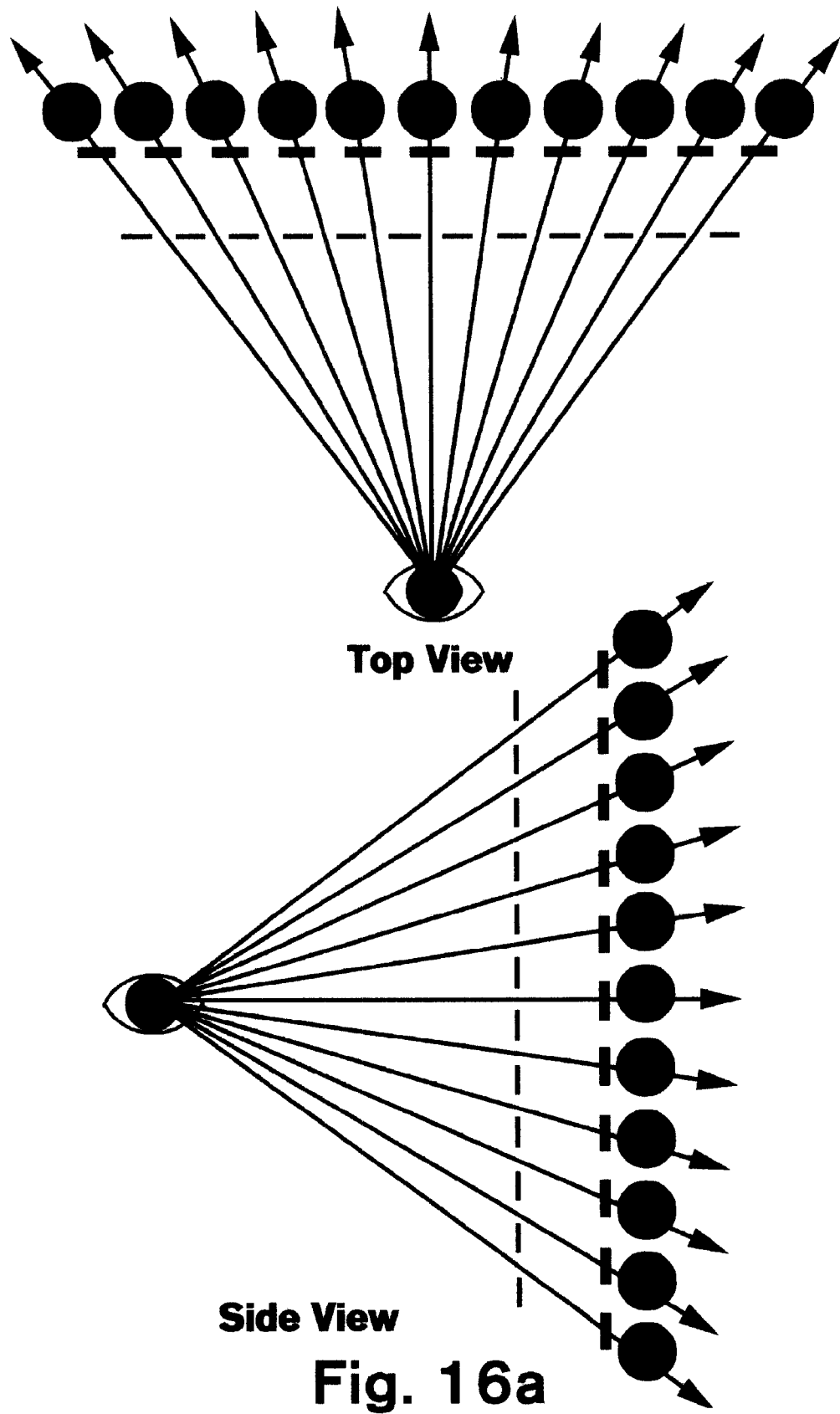
FIG. 16a illustrates a top and side view of an interwoven image having a pitch that is correct for the selected view distance and spacer width.
Figure 16B:
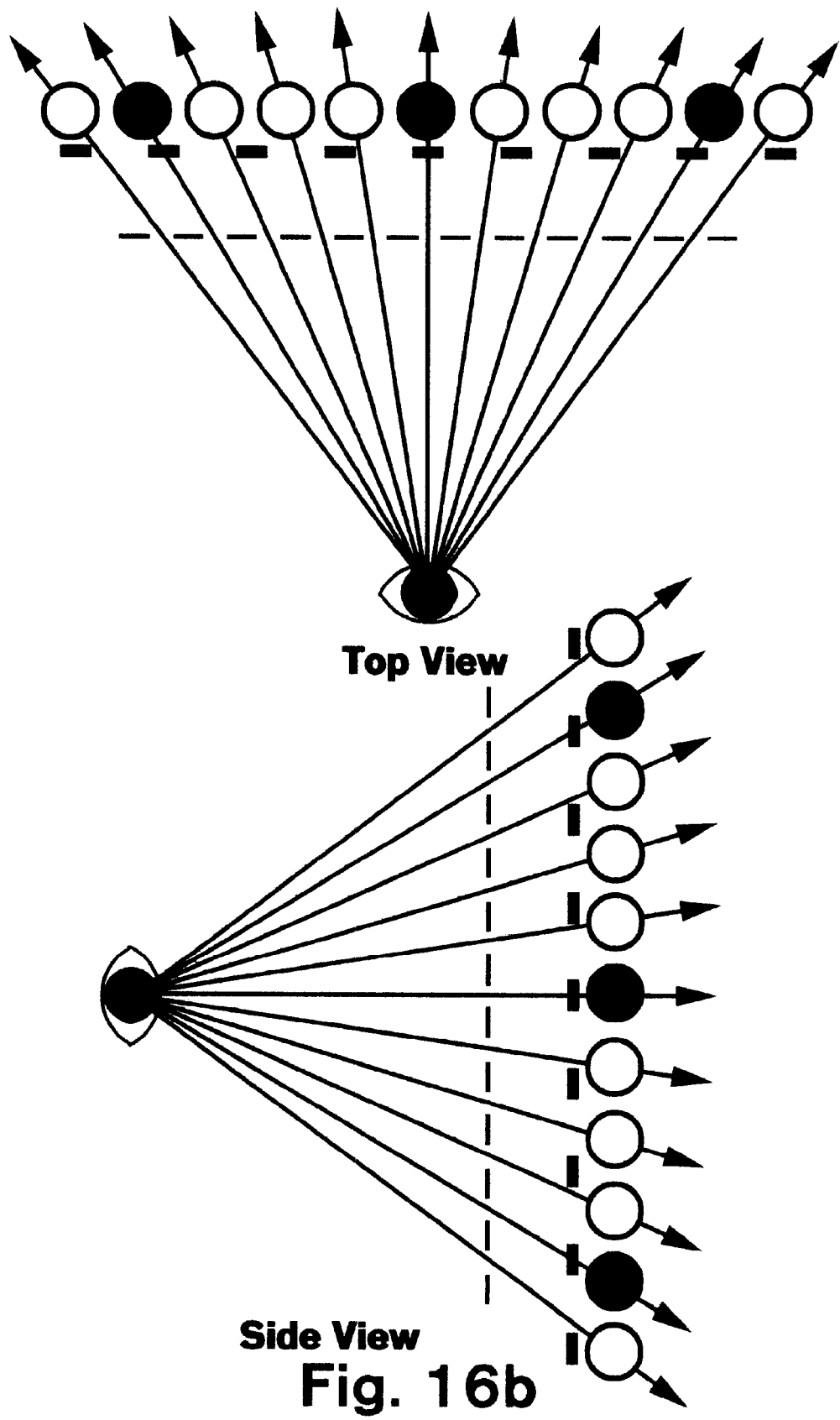
FIG. 16b illustrates a top and side view of an interwoven image having a pitch that is too large for the selected view distance and spacer width.
Figure 16C:
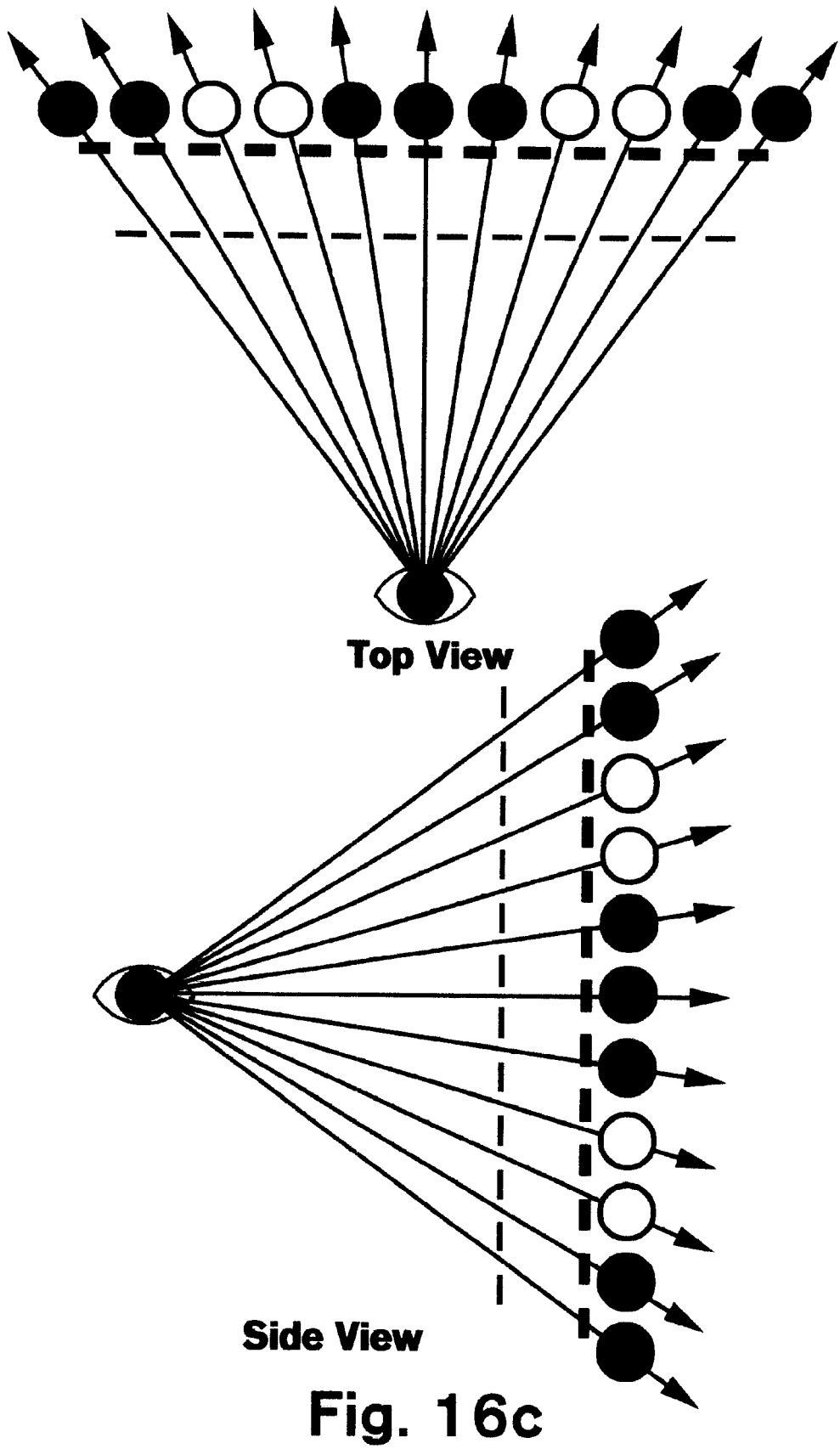
FIG. 16c illustrates a top and side view of an interwoven image having a pitch that is too small for the selected view distance and spacer width.

The alignment border can also be used to verify that the proper pitch/frequency relationship between the screen and interwoven image exists for a selected viewing distance and spacer width. A correct relationship between the screen and the interwoven image can be obtained by sizing the interwoven image. As previously stated, at the selected viewing distance, the alignment border will indicate whether or not the interwoven image has the proper pitch. FIG. 16A shows a top and side view of a Tru3D™ image where the interwoven image is sized for the viewing screen at a select viewing distance and spacer width. Only view elements corresponding with the alignment border pattern are observable. In FIGS. 16B and 16C, the interwoven image has a pitch that is larger and smaller, respectively, than required for the selected view distance and spacer width. Note that not all of the view elements corresponding with the alignment border pattern are observable. It is important to note that the portions of the pattern that are observable have a frequential relationship with the viewing screen. The observer will see a number of black bands known as interference or sizing bands. When the bands appear to roll left or right and moving closer to the pattern decreases the number of bands observed the sizing is too big and if the number of bands increases the sizing is too small. The number of sizing bands over the width and/or height of the image at a selected viewing distance and spacer width indicate the amount of error in the sizing. The following two formulas apply;

W=interwoven image width
B=number of bands observed
F=interwoven image cell frequency
SF=sizing factor
Sizing is Big: $SF=(W-(B*(1/F)))/W$ Sizing is Small: $SF=W/(W-(B*(1/F)))$ The sizing factor indicates the amount of deviation that occurred in the interwoven image reproduction process and/or errors in the viewing screen specifications. In this manner, the compensated adjustment factor can be determined.

In one embodiment, a set of border elements is purposefully enlarged and reduced to produce a predetermined interference pattern of bands. These bands are placed adjacent to the interwoven image in a known relationship. The interference or sizing bands help indicate color misregister in the reproduction process and screen to interwoven image vertical/horizontal alignment. Interference bands of a known configuration can be created using the following formulas.

W=width of the interwoven image border
F=viewing screen frequency
B=desired number of interference bands
E=enlargement factor
R=reduction factor $$E=((W*F)+B)/(W*F)$$

$$R=((W*F)-B)/(W*F)$$

For example, if the interwoven image is 9 inches, the screen frequency is 50 lpi and the number of interference bands desired is 1 per inch then 9 multiplied by 50 plus 1 divided by the quantity 9 multiplied by 50 which gives an enlargement factor of 1.00222222. The reduction factor is the reciprocal of the enlargement factor. These factors are applied to the viewing screen frequency to determine the frequency of the interference pattern.

Figure 17:
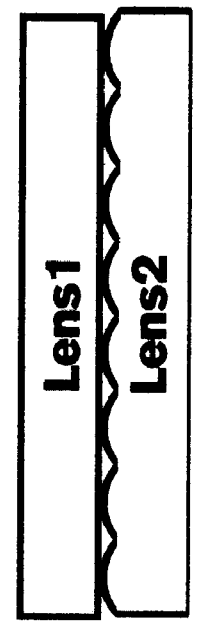
FIG. 17 illustrates a top, side and perspective view of a compound lenticular lens.
Figure 17:
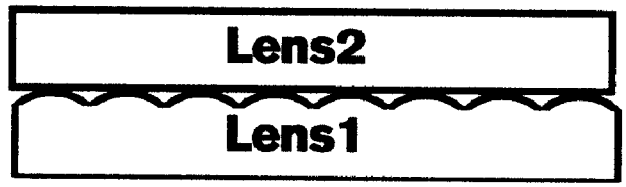
Figure 17:
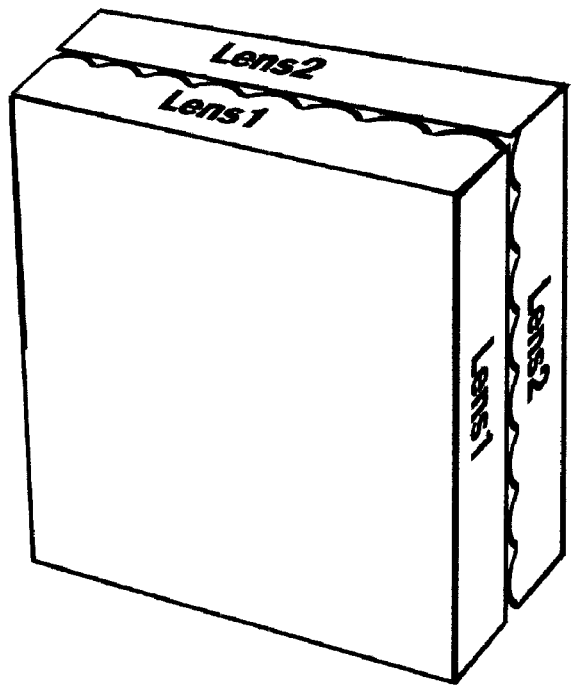

The viewing screen, i.e. transparent dots on an opaque surface, described in the preferred embodiment, acts as a filter separating the individual view elements from each perspective to produce the stereoscopic effect. It should be noted that light is preferably projected from behind the image for viewing. This is known as a light transmissive image. A reflective image does not require illumination from behind as evident in this printed page. It is possible to create a Tru3D™ image that is reflective and/or transmissive using various optical materials for the viewing screen. The fly's-eye lens or Fresnel zone plates described previously can be used. An additional viewing screen defined here as a compound lenticular lens can also be utilized. Lenticular materials are comprised of an array of hemi-cylindrical lens units known as lenticules. Lenticules magnify along one axis only. FIG. 17 shows a compound lenticular lens which is made from two lenticular lenses where the lenticules are adjacent and facing each other and rotated to opposing angles. The lenticules oriented vertically magnify only columns while the horizontally oriented lenticules magnify only row elements within those columns, thus isolating single elements. The compound lens is placed in proper alignment between the observer and interwoven image. Typically the two opposing lenticular lenses have the same optical properties although they could be different.

Figure 18A:
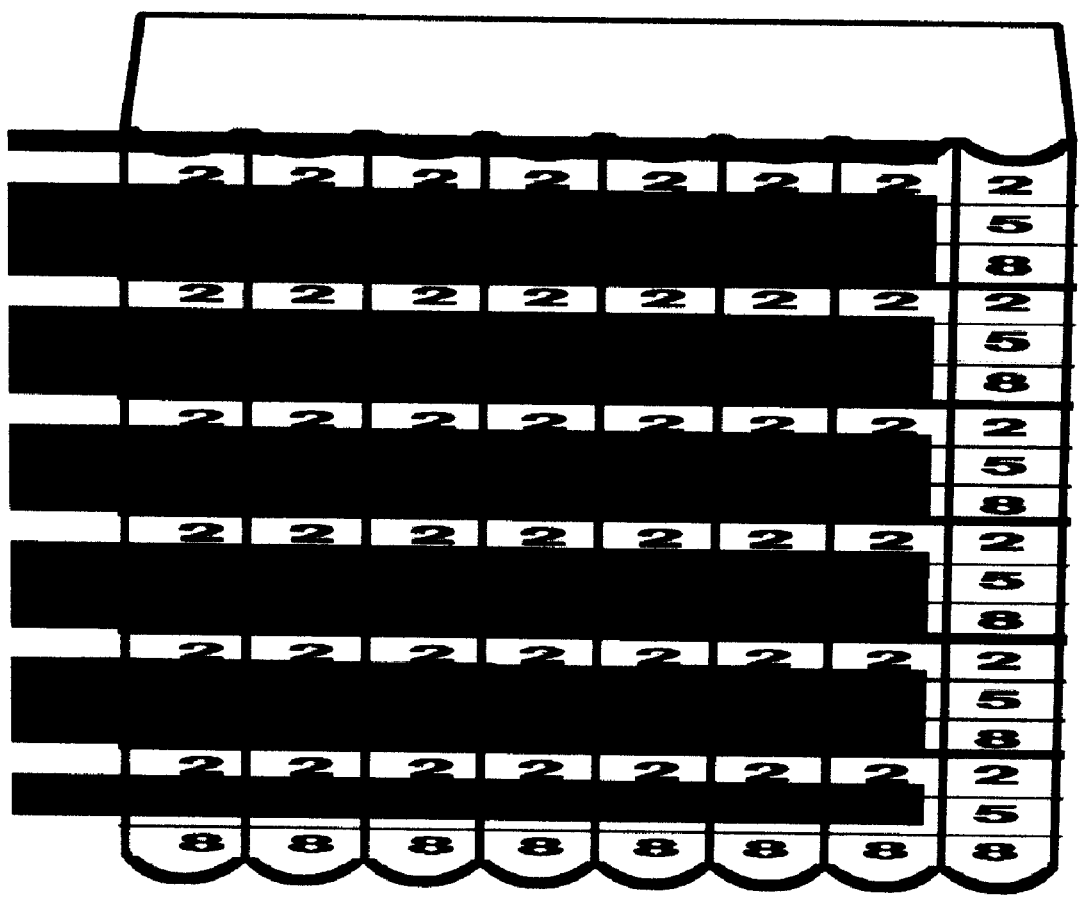
FIG. 18a illustrates a compound lens with a horizontal linear screen on top of a vertical lenticular lens and isolating element 2.
Figure 18B:
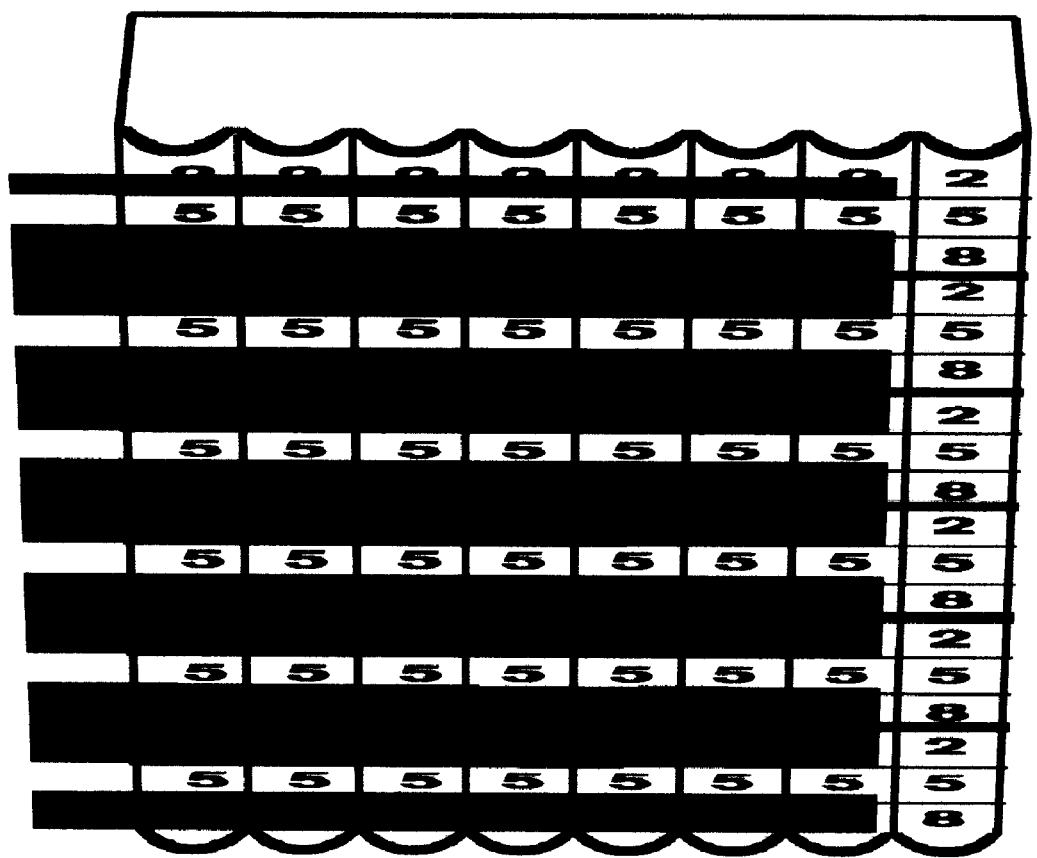
FIG. 18b illustrates a compound lens with a horizontal linear screen on top of a vertical lenticular lens and isolating element 5.
Figure 18C:
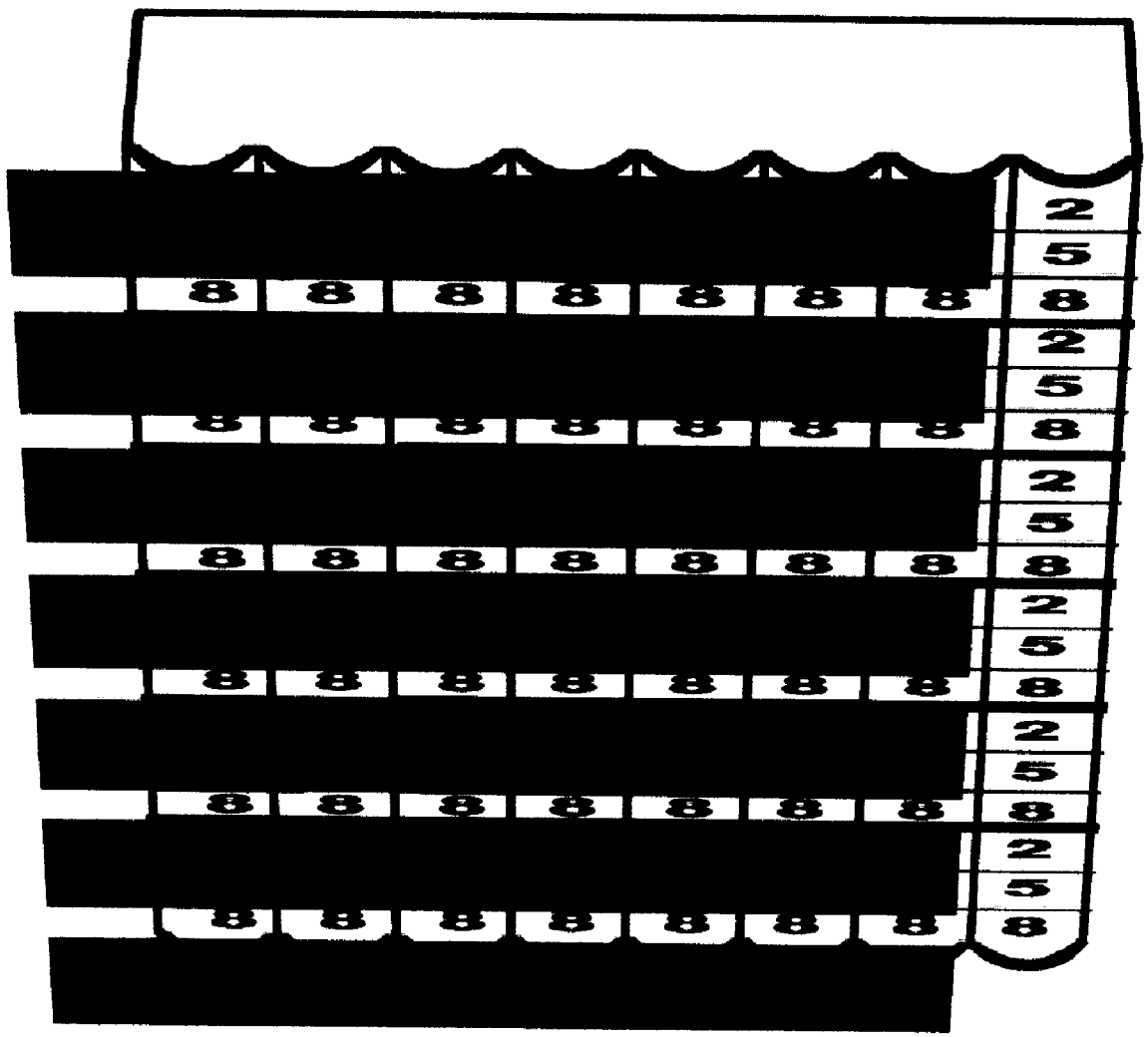
FIG. 18c illustrates a compound lens with a horizontal linear screen on top of a vertical lenticular lens and isolating element 8.
Figure 19:
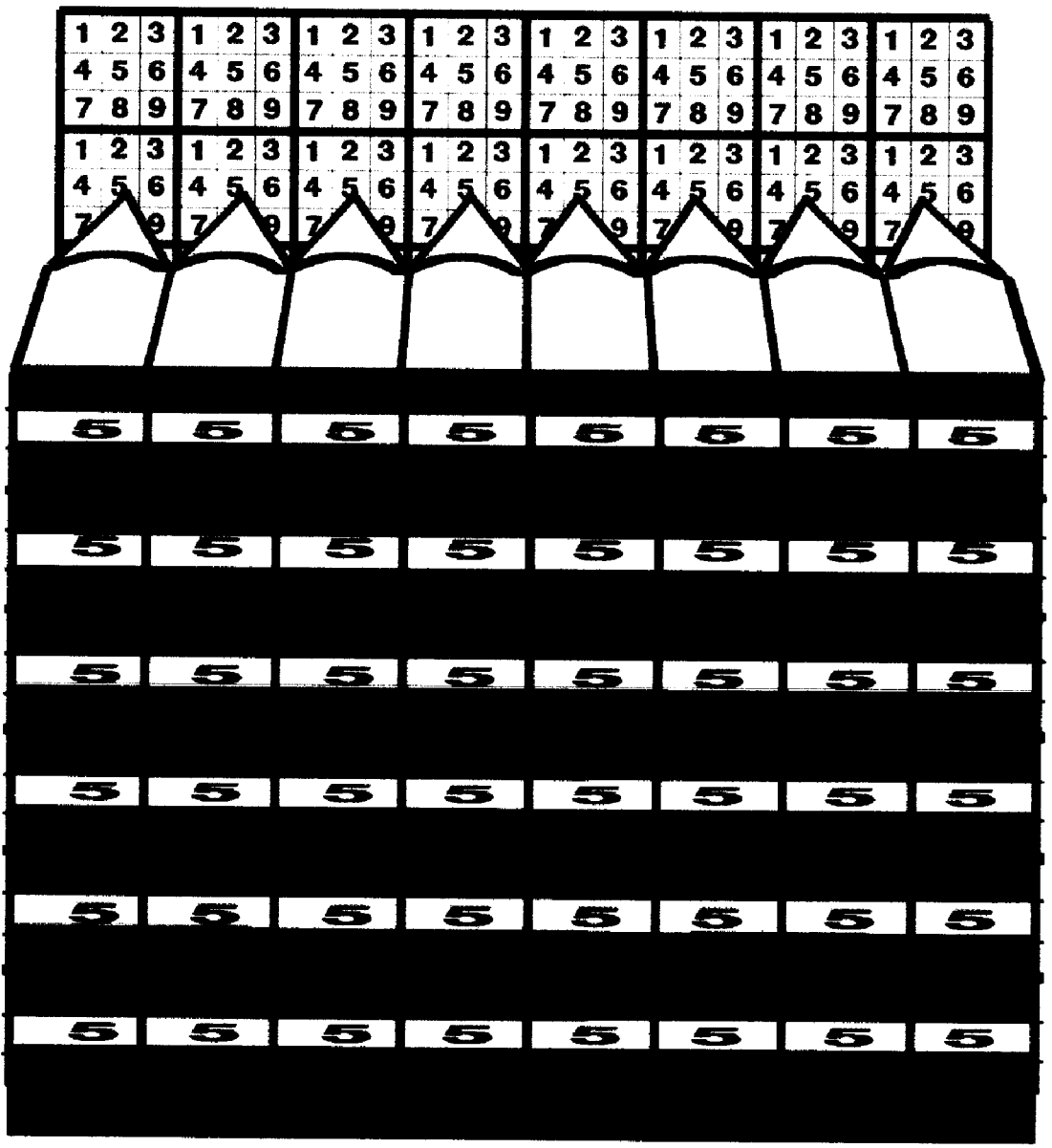
FIG. 19 illustrates a compound lens with a horizontal linear screen on the back of a vertical lenticular lens placed a distance from an interwoven image that is approximately equal to the focal length of the lenticular lens.

Compound lenses are not limited to two lenticular lenses in combination. FIGS. 18a–18c illustrate a compound lens embodiment wherein a vertically aligned lenticular lens magnifies a column and a linear screen placed at the front surface of the lenticular lens isolates a single row in those columns effectively displaying a single view element. FIG. 19 illustrates an alternate linear screen/lenticular lens combination wherein the linear screen is placed at the back or flat surface of the lenticular lens and this combination is aligned a distance approximately equal to the focal length of the lenticular lens from the interwoven image. Various other combinations are possible with the goal of isolating specific view elements. An additional embodiment provides for placing a means to magnify the Tru3D™ image between the observer and the image in order to increase the amount of depth perceived.

Various reproduction processes are available for mass production of Tru3™ images. Among these are inkjet printers, image setters, lithographic printing presses, screen printers, laser printers, digital presses and film recorders. The images can be formed on a substrate and mounted to the viewing screen or formed directly on the back surface of the viewing screen. Alternately, the viewing screen can be formed on a substrate and mounted to a spacer which can be back printed with the interwoven image or mounted to a substrate with an interwoven image printed on it. The spacer can also be back printed or mounted to a substrate before being mounted to the viewing screen. Another arrangement simply positions the viewing screen at a predetermined distance from the interwoven image using empty space instead of a spacer material. Likewise, with optical viewing materials the interwoven image can be printed directly to the back surface of the material, mounted to the material or positioned at a predetermined distance from the material. When using compound lenticular lens materials, the interwoven image can be printed directly to the back of the lens, mounted to the lens or positioned at a predetermined distance from the lens before or after the two sheets of lenticular material are placed together. The two lenticular lenses can be permanently attached to each other or simply positioned adjacent to each other. Optical materials that are thinner than the focal length of the optics can utilize a spacer material. Transmissive and reflective materials can be processed in sheets, rolls or as the surface of an injection molded component.

Tru3D™ images can be made to any size supported by the digital image output process chosen. It is also possible to enlarge Tru3D™ images beyond the limitations of the imaging device. Two approaches are available. The methods involve enlarging the output from digital film recorders. A working interwoven image and it's associated halftone screen can be enlarged to any size. If the interwoven image and the half-tone screen are enlarged by approximately the same amount the viewing distance will remain the same. The viewing distance and/or space between the interwoven image and viewing screen can be adjusted by enlarging the viewing screen and interwoven image by different amounts. Enlargement factors can be determined based on the formulas previously described. This method is particularly suited for making very large Tru3D™ images such as billboards or murals. It is also possible to create enlarged interwoven images to match a screen. For example an 8"×10" film recorder could be used to create an interwoven image that has a cell pitch that is four times the pitch of the desired viewing screen and then enlarged four times to match the pitch of the viewing screen. It should be noted that the photographic enlargement of an image inherently involves slight deviations in size and degradation of image integrity during the process. These deviations will be evident in the alignment border described previously.

Another method of reproduction involves projected interwoven images. Various projection process are available for both static and dynamic interwoven images. Among these are slide projectors, motion picture projectors, LCD displays, LCD projectors, overhead projectors, television, HDTV displays, computer displays, CTR displays, LED displays and LEP displays. The interwoven image can be formed on film or stored electronically and projected onto the back surface of a suitable viewing screen. It should be noted that the image should be projected so that the interwoven image formed on the back of the viewing screen is of the proper pitch. The methods previously described for enlarging interwoven images are similar to those for producing projected interwoven images.

The above is a detailed description of particular embodiments of the invention. Those of ordinary skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the full scope of protection to which the present invention is entitled.

What is claimed is:

1. A method according to creating a 3-dimensional image which is independently viewed at horizontal and vertical viewing angles comprising the steps of:
   (a) providing at least two source images in a memory;
   (b) converting each of said at least two source images into a matrix of picture elements grouped into cells, wherein said cells include at least two picture elements in width and height and wherein said picture elements have a first resolution and wherein said cells have a first pitch;
   (c) isolating select picture elements from said cells of each of said at least two source images;
   (d) interweaving said picture elements to form an interwoven image at said first resolution and said first pitch;
   (e) modifying the resolution of said interwoven image to a second resolution approximating the resolution of an output device to form a resolution matched interwoven image;
   (f) modifying the width and height of the resolution matched interwoven image to form a sized interwoven image, wherein the sized interwoven image is at a second pitch; and
   (g) overlaying the sized interwoven image with a viewing screen such that a 3-dimensional image is formed when said interwoven image is viewed from either a horizontal or vertical angle, at least a portion of said 3-dimensional image appearing as if it were above the viewing screen.

2. A method according to claim 1, wherein the viewing screen is selected from the group consisting of:
   a Fresnel zone plate, a halftone screen, an aperture-raster plate, an array of pinholes or apertures, a lenticular lens, two or more lenticular lenses in combination, an array of lenses arranged in a symmetrical configuration.

3. A method according to claim 1, wherein the viewing screen is aligned with and spaced from the interwoven image.

4. A method according to claim 1, wherein said 3-dimensional image includes a motion sequence.

5. A method according to claim 1, wherein said 3-dimensional image includes a perspective view.

6. A method according to claim 1, further comprising the step of acquiring said at least two source images with an image acquiring means such that they share a common aim point.

7. A method according to claim 1, further comprising the step of acquiring said at least two source images with an image acquiring means such that they do not share a common aim point.

8. A method according to claim 7, wherein said at least two source images that do not share a common aim point are aligned to share a common aim point prior to said conversion into a matrix of picture elements.

9. A method according to claim 1 further comprising at least one of the following steps:
   (e) matching the resolution of the interwoven image to that of the output device used to output the interwoven image;
   (f) determining cell pitches of the interwoven image and of the viewing screen;
   (g) matching the cell pitch of the interwoven image to that of the viewing screen;
   (h) resizing the interwoven image such that an acceptable 3 dimensional image is formed; and
   (i) aligning said interwoven image with said viewing screen such that an acceptable 3 degree dimensional image is formed.

10. A method according to claim 1, wherein said step (d) comprises the steps of:
   (D1) interweaving said picture elements to form image cells; and
   (D2) arranging said image cells into the interwoven image.

11. A method according to claim 1 wherein the relative position of an image capture device that captures said at least two source images during the preparation of a perspective sequence of images is spatially inverse relative to each such source image's picture element position in its respective image cell.

12. A method of producing a 3-dimensional image comprising the steps of:
   (a) creating an interwoven image on a computer from a plurality of source images, said interwoven image comprising a plurality of shaped cells, each said shaped cell being subdivided into image elements forming a pattern of elements from said plurality of source images, and said interwoven image having a first resolution and a first cell frequency;
   (b) outputting said interwoven image onto a surface; and
   (c) overlaying said surface with a viewing screen comprising a plurality of isolating elements present in a predetermined frequency such that different ones of said plurality of source images are viewable at different horizontal and vertical viewing angles.

13. A method according to claim 12, wherein step (a) further comprises at least one of the following steps of:
   (d) changing said first resolution of said interwoven image to substantially match a second resolution of an output device which will be used to output said interwoven image; and
   (e) sizing said interwoven image such that said first combined image cell frequency of said interwoven image matches said frequency of said screen of isolating elements; and
   (f) storing said interwoven image electronically.

14. The method of claim 12, wherein said plurality of source images represent a sequence of source images captured from an array of perspective locations by a capture method comprising at least one of the following steps:
   (1) selecting a number of locations equal to the number of said pattern of elements;
   (2) arranging the array of locations to have a shape that matches said cell shape;
   (3) simultaneously capturing a source image at each location;
   (4) capturing a source image at each location separately by moving an image capture device;
   (5) capturing a source image at each location such that each source image shares a common aim point; and
   (6) electronically realigning said captured source images such that they share a common aim point when they are interwoven.

15. A method according to claim 12, wherein said plurality of source images are perspective views from an array of known locations, said shaped cells have a shape corresponding to the shape of said array of locations, and said elements are arranged within said cells in an order which is the inverse or reverse of that of the coordinates of said perspective locations.

16. A method according to claim 12 further comprising at least one of the following steps:
   (1) matching said first cell frequency to the frequency of said isolating elements;
   (2) making the first cell frequency less than and within 10% of said frequency of said isolating elements; and
   (3) adjusting the first cell frequency to within 10% of said frequency of said isolating elements.

17. A method according to claim 12, wherein the resolution of each of said source images is converted to said first resolution prior to being interwoven.

18. A method according to claim 12, wherein said step (b) is performed by at least one of: a lithographic printing press; a screen printer; a digital press; an inkjet printer; a bubble jet printer; a film recorder; an image setter; a laser printer; a computer display; an electronic display; a digital projection device; and a digital image output device.

19. A method according to claim 12, wherein said interwoven image is projected onto a second different surface prior to step (c).

20. A 3-dimensional-image-device comprising:
   a viewing screen of isolating elements having a first frequency of isolating elements;
   an interwoven image having a first resolution and comprising a plurality of source images which are interwoven on a computer; wherein, said interwoven image has a second frequency of shaped cells, each cell comprising a pattern of image elements formed from said plurality of source images, said screen of isolating elements is spaced from said interwoven image; and
   different image elements observed by viewing the device at different vertical and horizontal viewing angles.

21. A 3-dimensional-image-device according to claim 20, wherein said viewing screen of isolating elements is a planar array of evenly spaced isolating elements selected from the group consisting of aperture elements; refractive optical elements; and diffractive optical elements.

22. A 3-dimensional-image-device according to claim 21, wherein said isolating elements of said viewing screen have at least one of the same horizontal and vertical frequency; different horizontal and vertical frequencies; a hexagonal configuration; a round shape; a square shape; a rectangular shape; a hexagonal shape; and a diamond shape.

23. A 3-dimensional-image-device according to claim 20, wherein said viewing screen is spaced away from said surface by at least one of a spacer material; an empty space; and a distance equal to the focal plane of said isolating elements.

24. A 3-dimensional-image-device according to claim 20, wherein said viewing screen of isolating elements is at least one of a negative half-toning screen and transparent spacer material; an aperture-raster sheet; a light transmitting body; an opaque surface with evenly spaced transparent portions; a compound lenticular lens; a fly's eye lens; a Fresnel zone plate; a lenticular lens and opposing linear screen; a lenticular lens; and a linear screen.

25. A 3-dimensional-image-device according to claim 20, wherein said interwoven image is on at least one of a rear surface of said screen of isolating elements; a rear surface of a spacer material; a substrate; a light sensitive material; photographic film; motion picture film; a projection screen; a computer monitor; a display; and a television.

26. A 3-dimensional-image-device according to claim 20, wherein the shape of said shaped cells are at least one of:
   (1) matches the shape of said isolating elements;
   (2) approximates the shape of said isolating elements; and
   (3) is different than the shape of said isolating elements.

27. A 3-dimensional-image-device according to claim 20, wherein said plurality of source images are at least one of sequential in time and sequential in space.

28. A 3-dimensional-image-device according to claim 20, wherein said plurality of source images comprises one of at least two source images; at least nine source images; up to 168 source images; and a number of source images equal to the number of said elements in said cell.

29. A 3-dimensional-image-device according to claim 20, wherein said screen of isolating elements comprises a magnifying means.

30. The 3-dimensional-image-device of claim 20, wherein said screen of isolating elements has a pitch which is less than a cell pitch of said interwoven image.

31. The 3-dimensional-image-device of claim 20, wherein said interwoven image forms an animated image when viewed at different viewing angles through said screen of isolating elements.

32. The 3-dimensional-image-device of claim 20, wherein said interwoven image has been output on a light transmissive surface and projected from behind said screen of isolating elements.

33. A method according to claim 12, wherein said viewing screen is selected from the group consisting of:
   a Fresnel zone plate, an halftone screen, an aperture-raster plate, an array of pinholes or apertures, a lenticular lens, two or more lenticular lenses in combination, an array of lenses arranged in a symmetrical configuration.

34. A 3-dimensional-image-device according to claim 20, further comprising a magnifying means adjacent said viewing screen.

35. A method according to creating a multi-axis integral image comprising the steps of:
   (a) providing at least four source images in a memory;
   (b) converting each of said at least four source images into a matrix of picture elements grouped into cells, wherein said cells include at least two picture elements in width and height and wherein said picture elements have a first resolution and wherein said cells have a first pitch;
   (c) isolating picture elements from each of said four source images;
   (d) interweaving said isolated picture elements to form an interwoven image at said first resolution and said first pitch;
   (e) modifying the resolution of said interwoven image to a second resolution approximating the resolution of an output device to form a resolution matched interwoven image;
   (f) modifying the width and height of the resolution matched interwoven image to form a sized interwoven image, wherein the sized interwoven image is at a second pitch; and
   (g) printing said sized interwoven image onto a substrate at the second resolution.

36. The method according to claim 35 further comprising the step of:
   (h) viewing the substrate bearing the sized interwoven image with a viewing screen having a viewing element pitch that approximates the second pitch, wherein said viewing of said sized interwoven image is accomplished from horizontal and vertical angles.

37. The method according to claim 36 wherein said viewing screen is at least one of a negative half-toning screen and transparent spacer material, an aperture-raster sheet, a light transmitting body, an opaque surface with even spaced transparent portions, a compound lenticular lens, a fly's-eye lens, a Fresnel zone plate, a lenticular lens and opposing linear screen, and a lenticular lens and a linear screen.

38. The method according to claim 35 wherein said substrate is a least one of a rear surface of a viewing screen, a rear surface of a spacer material, a substrate, a light sensitive material, photographic film, a projection screen, a computer monitor, a display and a television.

39. The method according to claim 35 wherein said at least four source images are at least one of sequential in time and sequential in space.

40. The method according to claim 35 wherein said at least four source images are a sequence of source images captured from at least one location by a capture method comprising at least one of the following steps:
  (1) simultaneously capturing source images, wherein each source image is captured at a unique location;
  (2) capturing source images with a single image capture device, wherein the single image capture device is moved to a unique location prior to the capturing of the source image;
  (3) capturing source images, wherein each source image shares a common aim point;
  (4) capturing source images, wherein at least two source images have different aim points; and
  (5) aligning each source image, wherein each source image shares a common aim point.

41. A method according to creating a multi-axis autostereoscipic image of a scene comprising the steps of:
  (a) providing at least four source images in memory, wherein at least two of said at least four images have the same horizontal perspective and different vertical perspectives and wherein at least two of said at least four images have the same vertical perspective and different horizontal perspectives;
  (b) converting each of said at least four source images into a matrix of picture elements grouped into cells, wherein said cells include at least two picture elements in width and height and wherein said picture elements have a first resolution and wherein said cells have a first pitch;
  (c) isolating picture elements from each of said four source images;
  (d) interweaving said isolated picture elements to form an interwoven image at said first resolution and said first pitch, wherein the isolated picture elements within each cell are positioned at the inverse of the horizontal and vertical perspectives of said at least four source images;
  (e) modifying the resolution of said interwoven image to a second resolution approximating the resolution of an output device to form a resolution matched interwoven image;
  (f) modifying the width and height of the resolution matched interwoven image to form a sized interwoven image, wherein the sized interwoven image is at a second pitch; and
  (g) printing said sized interwoven image onto a substrate at the second resolution.

42. The method according to claim 41 further comprising the step of:
  (h) viewing the substrate bearing the sized interwoven image with a viewing screen having a viewing element pitch that approximates the second pitch, wherein said viewing of said sized interwoven image is accomplished from horizontal and vertical angles and wherein at least a portion of said multi-axis autostereoscipic image appears as if it were above the viewing screen.

43. The method according to claim 42 wherein said viewing screen is at least one of a negative half-toning screen and transparent spacer material, an aperture-raster sheet, a light transmitting body, an opaque surface with even spaced transparent portions, a compound lenticular lens, a fly's-eye lens, a Fresnel zone plate, a lenticular lens and opposing linear screen, and a lenticular lens and a linear screen.

44. The method according to claim 41 wherein said substrate is a least one of a rear surface of a viewing screen, a rear surface of a spacer material, a substrate, a light sensitive material, photographic film, a projection screen, a computer monitor, a display and a television.

45. The method according to claim 41 wherein said at least four source images are at least one of sequential in time and sequential in space.

46. The method according to claim 41 wherein said at least four source images are a sequence of source images captured from at least one location by a capture method comprising at least one of the following steps:
  (1) simultaneously capturing source images, wherein each source image is captured at a unique location;
  (2) capturing source images with a single image capture device, wherein the single image capture device is moved to a unique location prior to the capturing of the source image;
  (3) capturing source images, wherein each source image shares a common aim point;
  (4) capturing source images, wherein at least two source images have different aim points; and
  (5) aligning each source image, wherein each source image shares a common aim point.

47. A method according to creating a hexagonal fly's-eye three-dimensional image of a scene comprising the steps of:
  (a) providing 168 source images in memory, wherein said 168 source images include perspective views and wherein the perspective views have a hexagonal fly's-eye horizontal and vertical relationship;
  (b) converting each of said 168 source images into a matrix of picture elements grouped into cells, wherein said picture elements have a first resolution and wherein said cells have a first pitch;
  (c) isolating picture elements from each of said 168 source images;
  (d) interweaving said isolated picture elements to form an interwoven image at said first resolution and said first pitch, wherein the isolated picture elements within each cell are positioned at the inverse of the horizontal and vertical perspectives of said 168 source images;
  (e) modifying the resolution of said interwoven image to a second resolution approximating the resolution of an output device to form a resolution matched interwoven image;
  (f) modifying the width and height of the resolution matched interwoven image to form a sized interwoven image, wherein the sized interwoven image is at a second pitch; and (g) printing said sized interwoven image onto a substrate at the second resolution.

48. The method according to claim 47 further comprising the step of:

(h) viewing the substrate bearing the sized interwoven image with a fly's-eye lens having a lens pitch that approximates the second pitch, wherein said viewing of said sized interwoven image is accomplished from horizontal and vertical angles and wherein at least a portion of said hexagonal fly's-eye three-dimensional image appears as if it were in front of said fly's-eye lens.

49. The method according to claim 47 wherein said viewing screen is at least one of a negative half-toning screen and transparent spacer material, an aperture-raster sheet, a light transmitting body, an opaque surface with even spaced transparent portions, a compound lenticular lens, a fly's-eye lens, a Fresnel zone plate, a lenticular lens and opposing linear screen, and a lenticular lens and a linear screen.

50. The method according to claim 47 wherein said 168 source images are a sequence of source images captured from at least one location by a capture method comprising at least one of the following steps:

(1) simultaneously capturing source images, wherein each source image is captured at a unique location;

(2) capturing source images with a single image capture device, wherein the single image capture device is moved to a unique location prior to the capturing of the source image;

(3) capturing source images, wherein each source image shares a common aim point;

(4) capturing source images, wherein at least two source images have different aim points; and (5) aligning each source image, wherein each source image shares a common aim point.

\* \* \* \* \*